United States Patent
Niederland et al.

(10) Patent No.: US 7,623,032 B2
(45) Date of Patent: Nov. 24, 2009

(54) OBJECT CONTROLLED ACCESS AND INVENTORY SYSTEM

(75) Inventors: Roger A. Niederland, Huntington Beach, CA (US); John F. Zumkehr, Orange, CA (US); James E. Chandler, Mission Viejo, CA (US)

(73) Assignee: Key Control Holding, Inc., Houston, TX (US)

( * ) Notice: Subject to any disclaimer, the term of this patent is extended or adjusted under 35 U.S.C. 154(b) by 1951 days.

(21) Appl. No.: 10/310,396

(22) Filed: Dec. 5, 2002

(65) Prior Publication Data

US 2004/0111323 A1 Jun. 10, 2004

(51) Int. Cl.
*G08B 13/14* (2006.01)
(52) U.S. Cl. ............ 340/568.1; 340/572.1; 340/825.49; 235/375
(58) Field of Classification Search ... 340/572.1–572.8, 340/10.1; 235/375, 385
See application file for complete search history.

(56) References Cited

U.S. PATENT DOCUMENTS

| | | | |
|---|---|---|---|
| 3,451,043 A | 6/1969 | Krause | |
| 4,419,734 A | 12/1983 | Wolfson et al. | |
| 4,519,522 A | 5/1985 | McElwee | |
| 4,549,170 A | 10/1985 | Serres et al. | |
| 4,575,719 A | 3/1986 | Bertagna et al. | |
| 4,595,922 A | 6/1986 | Cobb et al. | |
| 4,635,053 A | 1/1987 | Banks et al. | |
| 4,673,915 A * | 6/1987 | Cobb | 340/330 |
| 4,737,910 A | 4/1988 | Kimbrow | |
| 4,796,209 A | 1/1989 | Burk | |
| 4,812,985 A * | 3/1989 | Hambrick et al. | 235/385 |

(Continued)

FOREIGN PATENT DOCUMENTS

GB 1364535 8/1974

OTHER PUBLICATIONS

PCT, US9408425, Feb. 9, 1995.

(Continued)

*Primary Examiner*—Eric M Blount
(74) *Attorney, Agent, or Firm*—Jackson Walker L.L.P.

(57) ABSTRACT

The object control and tracking system of the present invention includes a computer, a system controller, and at least one object storage drawer housed within a security cabinet. The system controller provides a bi-directional communication link between the computer and a printed circuit board located within the object storage drawer. The objects are symmetrically shaped acrylic key fobs each containing a touch memory device to store information about as set of keys or other valuable objects associated with the fob. A dress plate, incorporating a plurality of slots for interfacing with the fobs, is within the drawer and provides the mechanical support for the key fobs. The key fobs are generally symmetrically shaped to fit into the slot. The slot spacing is staggered in the array so that it is easier for a user to replace or to locate the key fob if the array is almost fully occupied. The slots of the array are symmetrical in nature so that a user can insert the tongue of the key fob in either orientation into the slots of the array. The top side of a PCB board is in immediate contact with the bottom side of the dress plate. Symmetrical slots are cut through the PCB and are in alignment with the dress panel slots. On the bottom side of the PCB board, each slot contains pairs of downward, vertically extending, biased metal contacts. Each slot incorporates an LED for providing a visual indication to a user of the location of an empty slot or the location of an inserted fob.

54 Claims, 15 Drawing Sheets

U.S. PATENT DOCUMENTS

| | | | |
|---|---|---|---|
| 4,814,592 A | 3/1989 | Bradt et al. | |
| 4,845,492 A | 7/1989 | Cobb et al. | |
| 4,866,661 A | 9/1989 | de Prins | |
| 4,885,571 A | 12/1989 | Pauley et al. | |
| 4,889,977 A | 12/1989 | Haydon | |
| 4,896,024 A | 1/1990 | Morello et al. | |
| 4,918,432 A | 4/1990 | Pauley et al. | |
| 4,920,488 A * | 4/1990 | Filley | 235/385 |
| 4,967,906 A | 11/1990 | Morello et al. | |
| 5,038,023 A | 8/1991 | Saliga | |
| 5,287,414 A | 2/1994 | Foster | |
| 5,319,544 A | 6/1994 | Schmerer et al. | |
| 5,335,170 A | 8/1994 | Petteruti et al. | |
| 5,374,815 A | 12/1994 | Waterhouse et al. | |
| 5,404,384 A | 4/1995 | Colburn et al. | |
| 5,426,284 A | 6/1995 | Doyle | |
| 5,521,815 A | 5/1996 | Rose, Jr. | |
| 5,533,079 A | 7/1996 | Colburn et al. | |
| 5,801,628 A | 9/1998 | Maloney | |
| 5,836,002 A | 11/1998 | Morstein et al. | |
| 5,905,653 A | 5/1999 | Higham et al. | |
| 5,957,372 A | 9/1999 | Dean et al. | |
| 5,961,036 A | 10/1999 | Michael et al. | |
| 6,069,563 A | 5/2000 | Kadner et al. | |
| 6,073,834 A | 6/2000 | Michael et al. | |
| 6,075,441 A | 6/2000 | Maloney | |
| 6,131,808 A * | 10/2000 | Pires et al. | 235/375 |
| 6,195,005 B1 | 2/2001 | Maloney | |
| 6,204,764 B1 | 3/2001 | Maloney | |
| 6,232,876 B1 | 5/2001 | Maloney | |
| 6,262,664 B1 | 7/2001 | Maloney | |
| 6,317,044 B1 | 11/2001 | Maloney | |
| 6,707,381 B1 | 3/2004 | Maloney | |
| 6,745,366 B1 | 6/2004 | Roh et al. | |
| 6,788,997 B1 | 9/2004 | Frederick | |
| 7,336,174 B1 * | 2/2008 | Maloney | 340/572.1 |

OTHER PUBLICATIONS

PCT, US9412513, May 11, 1995.
Memory-Based Identifier Tag Provides Digital ID-Dave Bursky—Electronic Design-Jul. 25, 1992-pp. 153 and 156.

\* cited by examiner

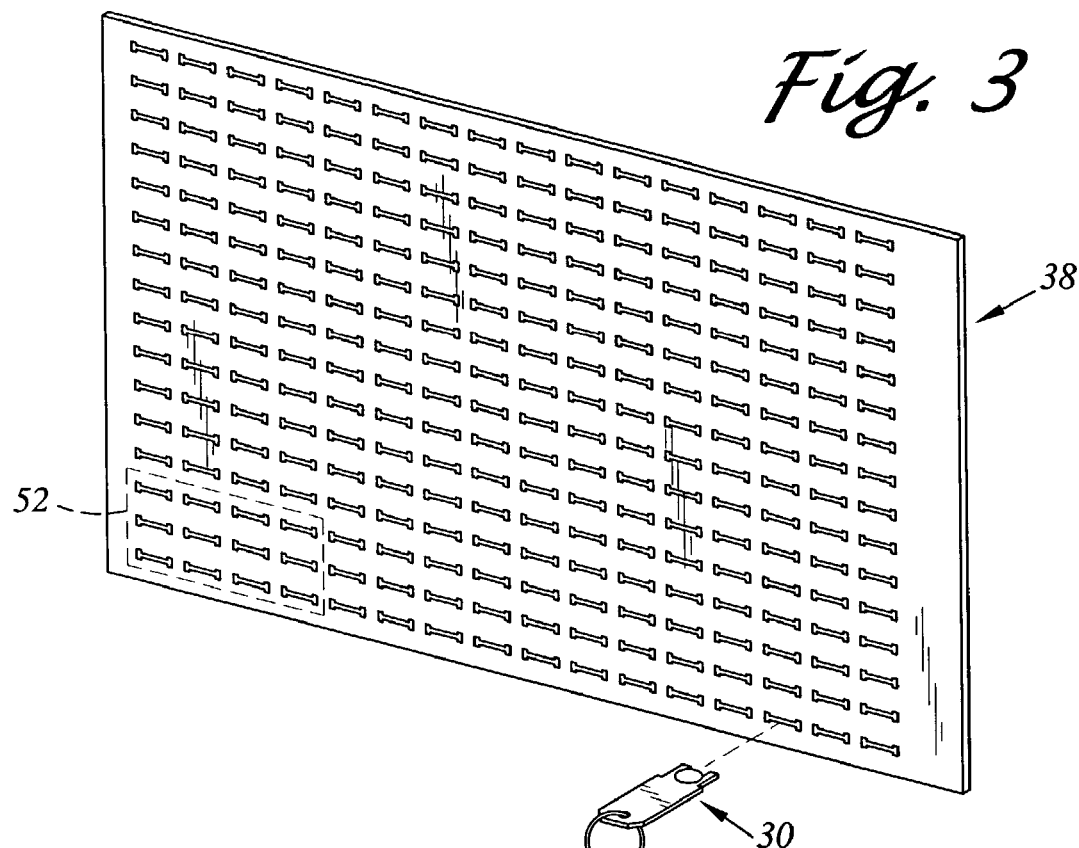
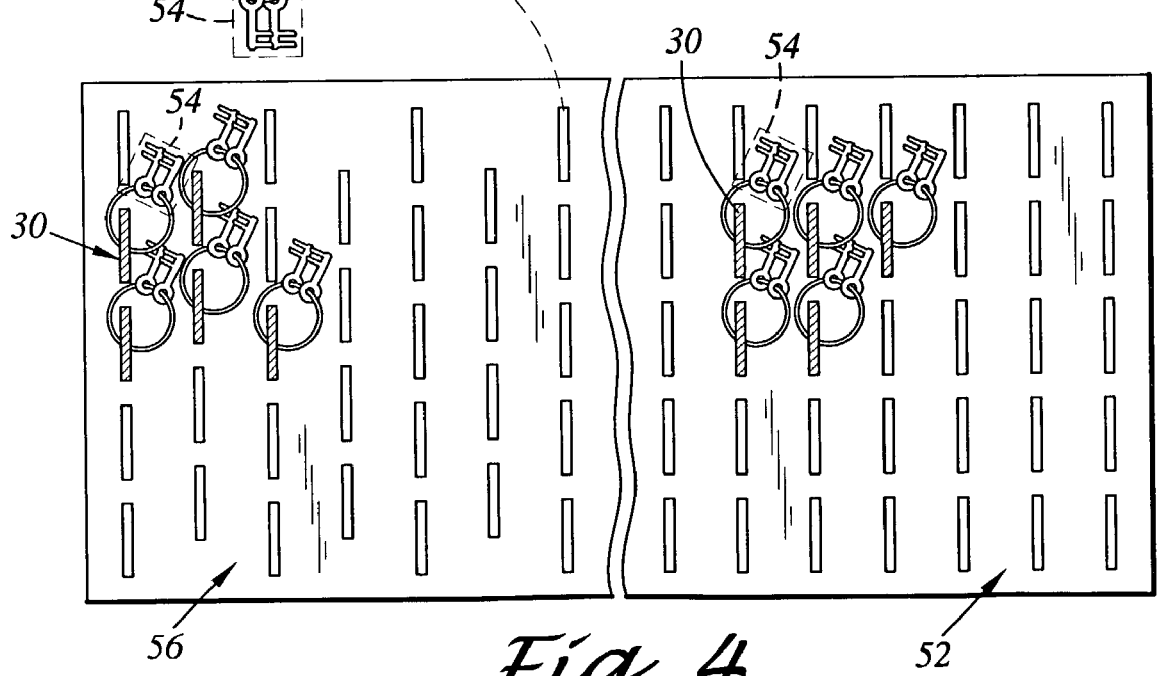

OBJECT CONTROLLED ACCESS AND INVENTORY SYSTEM

CROSS-REFERENCE TO RELATED APPLICATIONS (Not Applicable)

STATEMENT RE: FEDERALLY SPONSORED RESEARCH/DEVELOPMENT (Not Applicable)

FIELD OF THE INVENTION

The present invention generally relates to a system that stores and tracks valuable objects. More particularly, in its most preferred embodiments, the invention comprises an automatic storage and inventory system for security fobs that allows for a more versatile and reliable interface with the fobs and a visual indicator for designating selected fobs.

BACKGROUND OF THE INVENTION

There is a great need to store objects, such as keys, in a secure location to avoid the unwanted and potentially unlawful use of the object. In particular, the unauthorized use of keys may result in the theft of vehicles, unlawful entry into locked area that may have valuable items or sensitive information stored or the unwanted intrusion into areas that may be dangerous or where individual privacy may be of concern.

Frequently, where numerous keys are involved, as a further level of security, such keys lack any indicia that would identify the key's intended interface. While the deletion of indicia may add security, it creates problems for the proper users of the keys, particularly where numerous keys are involved and where those keys need to be stored in a single location. Identifying the proper key for a particular lock or vehicle can be problematic.

For example, car dealerships may have hundreds of vehicles with each having a corresponding set of keys. The keys are typically kept in a secure location, but such key sets lack identifying information to thwart theft of vehicles when unauthorized persons gain access to key sets Due to the lack of identifying information, dealerships devised numerous schemes to allow reasonable access to the keys by employees, while maintaining security. Prior to the digital technology revolution, dealerships used crude inventory tracking schemes but with the introduction of computers, automated systems for tracking keys were developed.

An automated object tracking and control system is described in U.S. Pat. Nos. 5,801,628 and 6,075,441 (hereinafter "Maloney references"), the substance of which are incorporated herein by reference. The Maloney references employ security fobs, plastic inserts that are associated with each set of keys. Each security fob has an on board touch memory device for storing information about the associated key set. The security fobs, when inserted through the slots of an upper panel, electrically interface with connections of a lower printed circuit board (PCB). The slotted panel and corresponding PCB are located within a drawer of a lockable cabinet used to securely store the fob and key sets. Each slot includes corresponding indicia indicating row and column numbers as well as proper insertion orientation. The PCB is in electrical communication with a computer that records, tracks, and controls access to plastic key fobs that are inserted through the panel into a main PCB. The memory device stores the status of the objects associated with the key fob. Through the upper panel, the key fob is inserted into slots. Below the backside of the upper panel, a pair of metal contacts vertically protrudes from the top side of the PCB back plane and contacts the tongue of the key fob. The tongue of the key fob is asymmetrically shaped, requiring the key fob inserted into the printed back plane in one orientation. This orientation requires that one contact of the pair is associated with a row of the array and the other contact is associated with the column of the array. A peripheral device connected to the computer displays the row and column number to help the user locate an empty slot or set of inserted keys.

There are several problems associated with previous disclosed systems. When the slot array is nearly full of key fobs, locating the open slot is difficult and reading the indicia on the panel is problematic. Further, inserting the fob in the proper orientation is made difficult by the surrounding key fobs that block the view of the open slot. Another problem associated with previously disclosed systems is that such systems require a user to look at the computer screen for the row and the column number of the key fob, and find the row and column number of the desired key fob from an array of key fob slots within the drawer. This manual task to locate or replace a key fob is clumsy because a user is required to simultaneously do the following: remember the row and column number, locate the desired row and column, and select the row and column associated with the desired key fob from an array of key fobs.

Another problem with previously disclosed systems involves pairs of vertically protruding metal contacts that provide the entire mechanical support for the key fob structure. Large forces are present on the pairs of metal contacts because of the weight of the keys at the end of a lever formed by the key fob arm about the fulcrum formed by the metal contact point with the memory device. The system as disclosed by the Maloney references attempt to address the key fob support by riveting the pairs of metal contacts to the back plane board. This riveting attachment increases system overall manufacturing cost because the riveting operation is expensive and does not likely address the potential of premature contact failure.

Another problem with previously disclosed systems is the air-gap between the panel board and the printed circuit board. Dirt and debris can enter slots in the panel and contaminate upwardly protruding metal contacts and other electronic components, or short-out electronic traces on the printed circuit board.

Thus, there is a need for an improved object system that tracks and controls access to objects that addresses the above described problems as well as providing additional advantages over existing art.

SUMMARY OF THE INVENTION

The objects described in following description are key fobs, which are only exemplary in nature and only represent the best mode of practicing the invention, and are not intended to limit the scope of the invention. An object should be interpreted as any item, including but not limited to key fobs that a user desires to track, record, monitor or inventory.

The object control and tracking system of the present invention generally includes a computer, a system controller, and at least one object storage drawer. The computer receives, records, and transmits information about objects that are being tracked. A system controller provides a bi-directional communication link between a computer and at least one object storage drawer. The objects are generally symmetrically shaped key fobs containing a memory device. An electromechanical switch controls at least one object storage drawer. A user inputting to the computer an authorized electronic signal unlocks or locks at least one object storage drawer. Each object storage drawer contains one or more dress plates.

A dress plate, about ½ to ¾ inches thick, provides mechanical support for the key fobs. The dress plate contains an array of slots that are generally symmetrically shaped. The key fobs are generally symmetrically shaped to fit into the slot. The key fob contains a tongue at one end and keys attached at the other end. Each slot accepts the tongue of the key fob that contains a memory device. In one embodiment, the slot spacing is staggered in the array so that it is easier for a user to replace or to locate the key fob if the array is almost fully occupied. The slots of the array are symmetrical in nature so that a user can insert the tongue of the key fob in either orientation into the slots of the array.

A main board provides electrical connections to the key fob memory device. The top side of the main board is directly connected to the bottom side of a dress plate. Symmetrical slots are cut through the main board and mate with the dress panel slots. On the bottom side of the main board, each slot contains pairs of downward, vertically extending, biased metal contacts. These pairs of contacts are not required to physically support the rectangular key fob because the about dress plate provides the necessary physical support for the key fob plus keys. The pairs of metal contacts electrically connect to a memory device contained within the tongue of the key fob. The pairs of contacts provide proper dc bias for the memory device, i.e., one contact provides a plus voltage supply and the other contact is a return path to ground. The pairs of contacts receive and transmit data from a data line, such as a serial bus line on the main board, through an electrically connected logic control section.

The logic control section communicates data on each key fob to a peripheral control section. The peripheral control section converts the signals from the logic control section to a signal readable by the attached main computer. Electrical hardware comprising pull-up resistors on each pair of metal contacts allows dc bias to be applied to either metal contact to activate the memory device contained on the tongue of the key fob. In one embodiment of the present invention, the logic control section contains one or more field programmable gate arrays (FPGAs) user programmed to perform the following functions: to detect the presence of memory devices in the array; to poll each memory device as to current status; to read data from each memory device; and to correctly transfer the data to an addressable I/O port located on the FPGA. Afterwards, a peripheral control section multiplexes the data from the FPGA onto a complementary Universal Serial Bus (USB) line that transfers the data to the main computer data banks for user information.

To assist a user locating a key fob, a key fob illumination scheme is provided. In one embodiment of the present invention, one or more light emitting diodes, LEDS, are lit along the user desired key fob. The key fob is constructed of a translucent material such as acrylic. In another embodiment of the present invention, the memory device material is reflective. When a user desires to locate a key fob in the array, a LED lights the desired slot in the array, the light reflects off at least one outside surface of the memory device, traveling through the translucent material key fob, and lighting the edges of the translucent material for one or more key fobs. This illumination scheme locates for a user the desired key fob out of an array. This illumination scheme will work with other systems and should not be limited in any way by its use in the preferred embodiment described above. Other objects, features, and advantages of the present invention will become apparent upon reading and understanding the present specification when taken in conjunction with the appended drawings.

BRIEF DESCRIPTION OF THE DRAWINGS

FIG. 3 is a pictorial illustration of a dress plate of the present invention showing a symmetrical slot alignment;

FIG. 4 is a schematic illustration showing two alternate dress plate configurations of the present invention;

DETAILED DESCRIPTION OF THE PREFERRED EMBODIMENT

The detailed description as set forth below in connection with the appended drawings is intended as a description of the presently preferred embodiments of the present intention, and does not represent the only embodiment of the present invention. It is understood that various modifications to the invention may be comprised by different embodiments and are also encompassed within the spirit and scope of the present invention.

Figure 1:
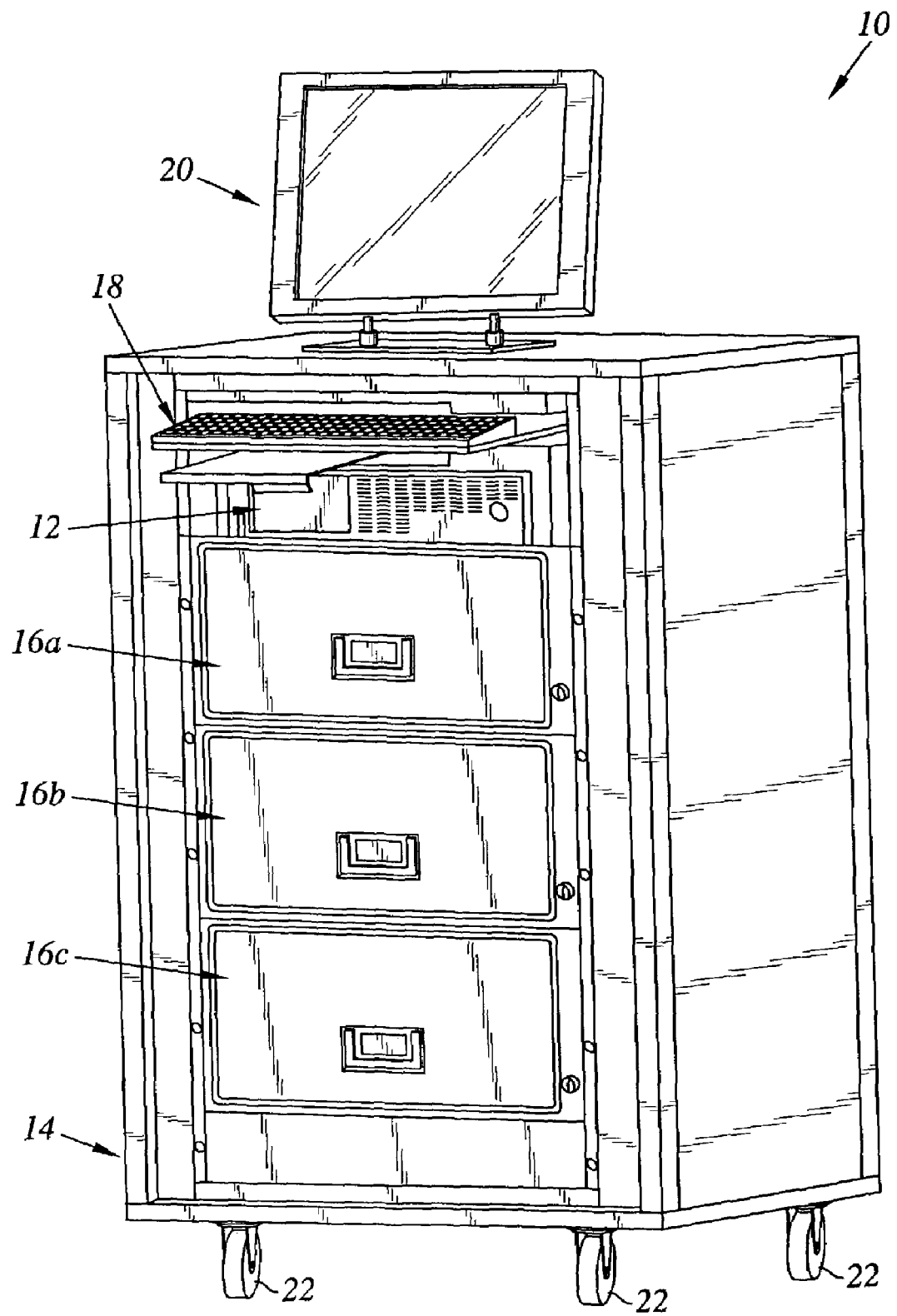
FIG. 1 is a perspective view of the exterior cabinet of the system of the present invention.

Referring particularly to FIG. 1, there is shown the exterior cabinet 14 of the system 10 of the present invention. The system 10 of the present invention generally includes a computer 12 incorporating a microprocessor or controller (not shown, a security cabinet 14, and drawers 16a, 16b and 16c. Although the drawing of FIG. 1 demonstrates a three drawer cabinet, the cabinet may comprise one to four drawers. The computer 12 generally executes software routines that receive data signals communicated from electrical contacts (not shown) from within drawers 16a, 16b and 16c of the security cabinet 14. The computer 12 also stores data so that it can track or inventory objects (not shown) presently or at a future date. Although the drawing of FIG. 1 shows a rack mounted computer 12, the computer may be remote from the cabinet or otherwise configured in the cabinet. Peripheral devices generally include a keyboard 18, mouse (not shown) and a monitor 20. In addition, the device may include a thumb reader (not shown) for additional security. The keyboard 18 allows a user to input requests for object status within the drawers 16a, 16b and 16c and the monitor 20 displays the requested information. The security cabinet 14 protects objects (not shown in the figure) located within drawers 16a, 16b and 16c from unauthorized access. As will be recognized by one skilled in the art, the security cabinet 14 is formed of material found in existing security cabinet drawer systems. In the particular configuration of the system 10 as shown in FIG. 1, the cabinet 14 is supported by castors 22, for mobilizing the system 10 so that it can be moved about for ease of access and potentially stored in another secured area for further security when the system 10 is not in use. Although the cabinet 14, shown in FIG. 1, is supported by castors, it could also be placed directly on the floor or other surface. In addition, although three drawers are shown any number of drawers may be utilized.

Figure 2:
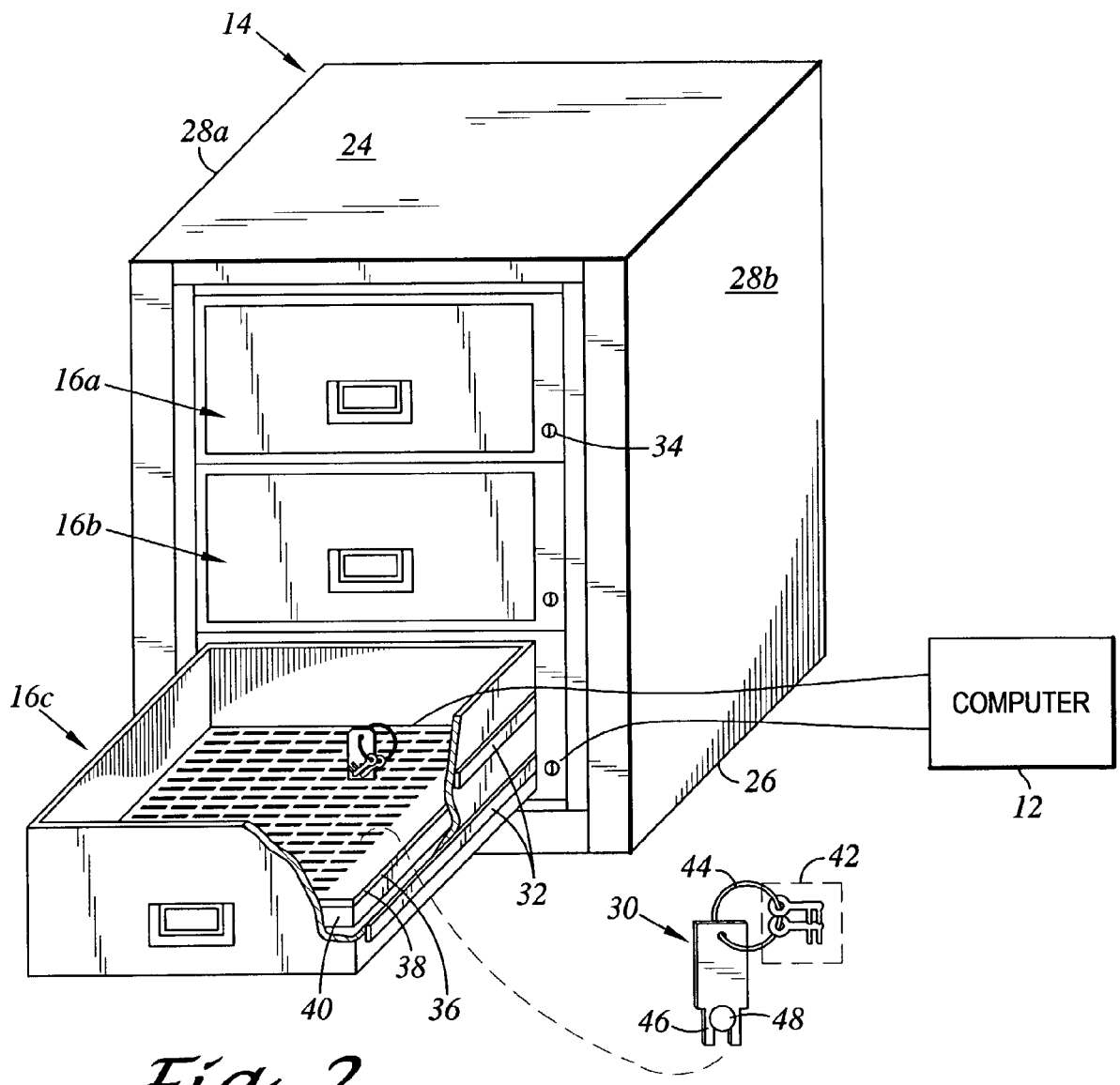
FIG. 2 is a perspective view of an open cabinet drawer of the present invention showing the slot array and a single fob.

Referring particularly to FIG. 2 a perspective view of the cabinet 14 is shown with drawer 16c in an open position. The security cabinet 14 generally consists of a top 24, a bottom 26, a rear wall (not shown), sidewalls 28a and 28b, and drawers 16a, 16b and 16c. The security cabinet 14 is generally made of a high durability and strength material such as steel or aluminum. The security cabinet 14 contains drawers 16a, 16b and 16c that can be pulled out to reach a desired key fob 30 within the drawers 16a, 16b or s16c. As shown, with drawer 16c used as an example, the draws 16a, 16b and 16c slide along horizontally oriented metal guides 32. The key fobs 30 are made of a strong, rigid material such as acrylic, however, as recognized by one skilled in the art, any strong rigid material could be used. To prevent unauthorized access to the drawers 16a, 16b and 16c, a locking mechanism 34 is generally attached to each drawer to secure the drawers in a closed position within the security cabinet 14. Locking mechanisms 34, such as an electromechanical switch (not shown) electronically actuated by the computer 12 to lock or to unlock one or more of the drawers. Although the drawing of FIG. 2 shows the lock mechanism on the front of the cabinet, the mechanism may also be located on the back of the cabinet. In an embodiment of the present invention, a user inputs to a keyboard 18 an identification code that is cross-referenced to one or more databases located in the computer storage device. After the authorization status of a user is verified, a user can request information about specific or select groups of key fobs 30. It is contemplated by the present invention that a manual override key may be utilized to physically unlock the lock mechanism 34 by using a traditional key.

Each drawer 16 of the security cabinet 14 includes a reception panel 36 comprised of a dress plate 38 affixed to a main board 40. The main board 40 is a standard circuit board and is formed of such material as is known to one skilled in the art. Although the embodiment shown in FIG. 2 includes a single reception panel 36, it is contemplated by the present invention that a drawer may include more than one reception panel.

Within the slots of the reception panel 36, key fobs 30 are inserted. For purposes of this application, the term fob means any structure that may be inserted into apertures and slots. In addition, although the shown embodiment shows keys interconnected to the fobs, it is contemplated that other objects may be inventoried and tracked such as jewelry or security badges. In the shown embodiment, the key fob 30 is attached to keys 42 through a metal ring 44 at one end and a tongue 46 containing a built-in memory device 48 at the other end. Although a metal ring is shown, keys may be connected by nylon rivets, metal rivets or tie wraps. In the shown embodiment, the memory device 48 is a 1990 Ibutton as manufactured and marketed by Dallas Semiconductor. The main board 40 is electrically connected to a computer 12 and derives power from a USB connection (not shown).

Referring particularly to FIG. 3, dress plate 38 is shown. Each drawer 16a, 16b and 16c contains at least one dress plate 38. The dress plate 38 provides mechanical support for a plurality of key fobs 30 inserted in the array 52 that is comprised of a series of rows of slots in alignment throughout the dress plate 38. The dress plate 38 is formed from a hard non-electrically conducting material such high density as plastic or acrylic. The dress plate 38 contains an array of slots 52 to allow insertion of a key fob 30. The dress plate 38 is generally greater than ½ inch of an inch thick to physically support the key fob 30 weight plus plurality of keys 54 that are attached at the end of the key fob 30. The size of the slots of the array 52 is sized to removably receive the fob 30.

FIG. 4 schematically illustrates an embodiment of the present invention using the dress plate column slot array 52 configuration (on right) in comparison with a dress plate staggered slot array 56 (on left). A plurality of keys 54 typically dangles from any one key fob 30. When a symmetrical arranged slotted array 52 is almost fully populated with key fobs 30, the dangling keys 54 will overlap and obstruct both the filled slots and available open slots in the array. This obstruction of the key slot locations by adjacent dangling keys 54 prevents a user from readily locating the desired key fob 30 or an available open slot in the array. In the staggered slot layout 56, the dangling keys 54 will be spaced at regular intervals from each other instead on top of each other so that when the array 56 is nearly fully populated, a user can still readily identify the key fob locations.

Figure 5A:
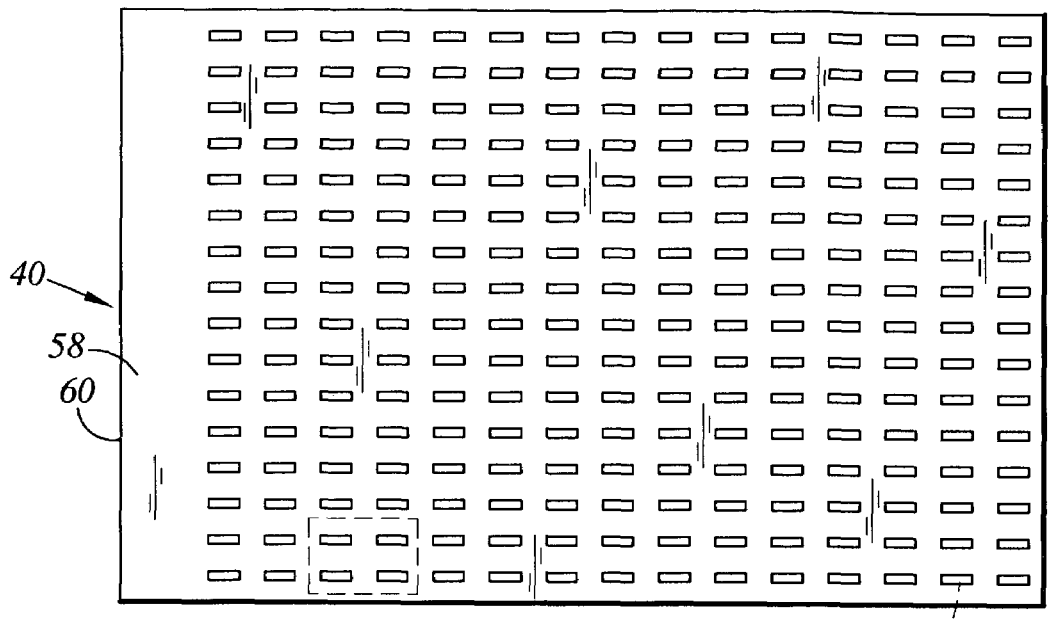
FIG. 5A is a view of the topside of a main board of the present invention.
Figure 5B:
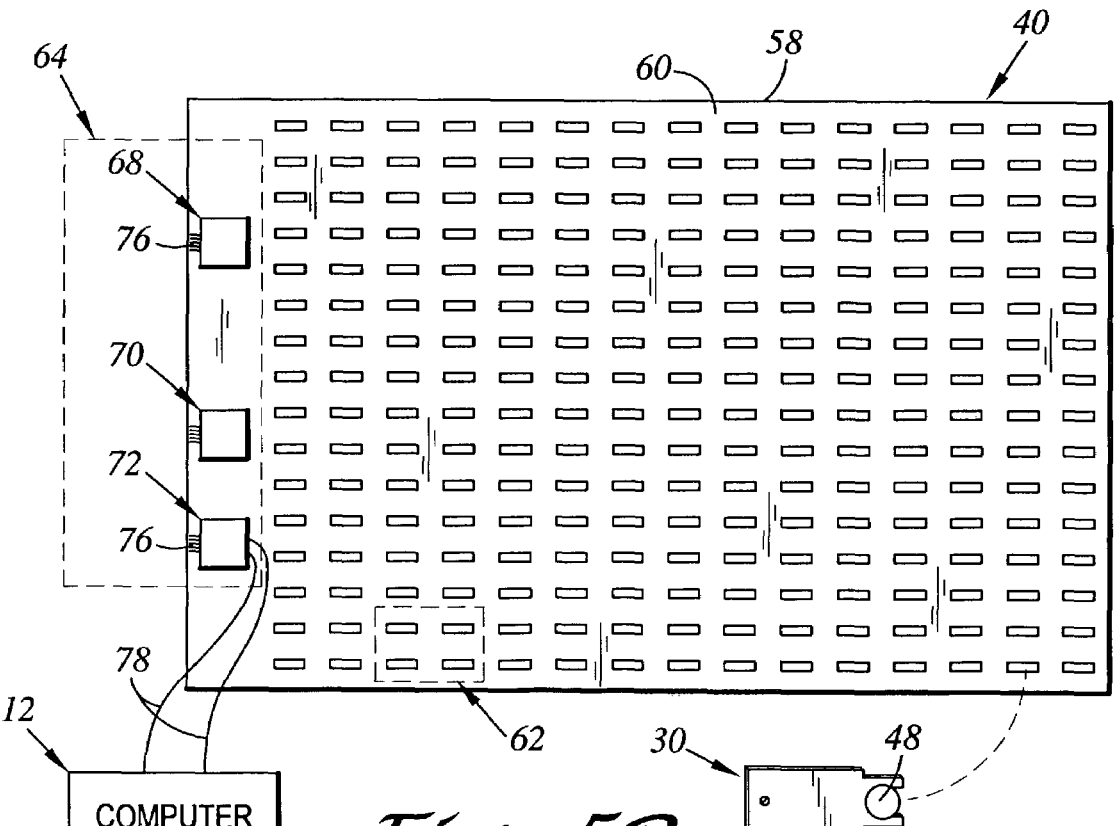
FIG. 5B is a view of the bottom side of a main board of the present invention showing the slot array.
Figure 5C:
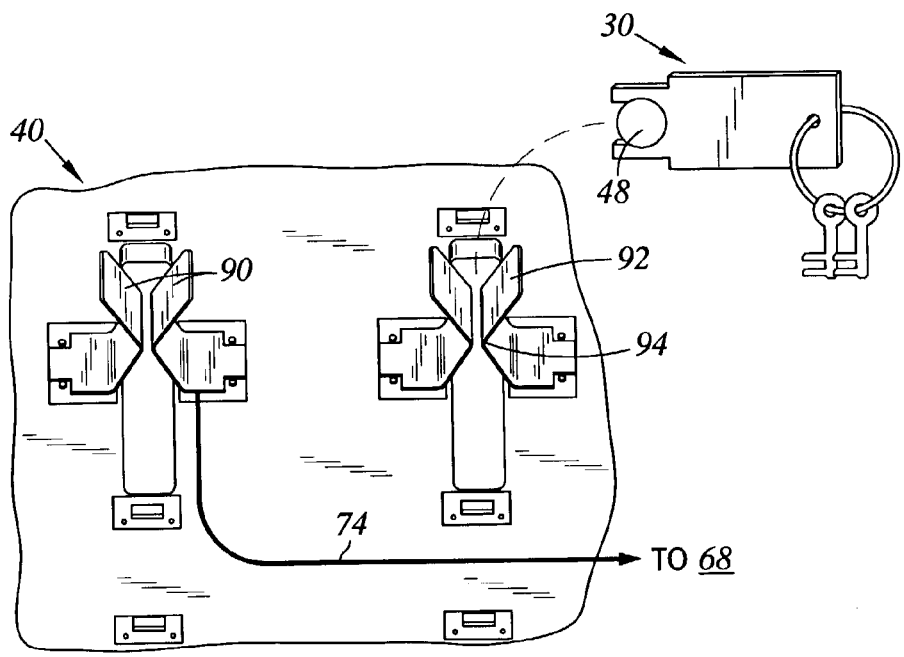
FIG. 5C is a cut away view of the bottom side of a portion of the main board of the present invention showing biased contacts.

FIG. 5A, FIG. 5B and FIG. 5C shows the top 58 and bottom 60 sides of the main board 40, respectively. The main board 40 is located inside of each drawer (not shown). The main board 40 has a bottom side 60 and a top side 58. The main board 40 generally contains slots 62 that accept the tongue 46 of the key fobs 30. The slots 62 on the main board 40 are aligned with the slots on the dress plate 38(not shown).

The bottom side 60 of the main board 40 includes electronic hardware 64. The electronic hardware 64 generally communicates data between a memory device 48 and computer 12, such as the insertion or removal of a key fob 30 in a slot in a drawer 16 in the security cabinet 14 or read the fob on demand. The following is a brief overview explaining the functionality of the main board 40 explained in more detail in relation to the system controller.

In the shown embodiment of the present invention, there are two Programmable Gate Arrays (FPGAs), 68 and 70, and a Universal Serial Bus (USB) peripheral controller 72 on the bottom side 60 of the main board 40. The FPGA 68 sends a communication signal through an electrical connection 74 to at least one memory device 48 of a key fob 30. In addition, upon a demand request the FPGA 68 receives an identification code from the memory device 48 to determine whether the memory device 48 is inserted or missing from the main board 40. The FPGAs 68 and 72 and software code to program the FPGAs 68 and 72 are commercially available from many suppliers such as XLINX. FPGAS 68 and 70 are programmed to read the status of the slots upon startup or can be programmed on demand. Periodically, or in demand, the computer 12 can download this information about one or a group of key fobs 30 located or missing in the slot array through a peripheral interface section 72.

In the shown embodiment of the present invention, the USB peripheral controller Cypress Ucore 72 is utilized. The Cypress Ucore 72 is user programmed using commercially available software and software routines provided by the manufacturer, to map the information from the FPGA 68 through a general purpose input/output (GPIO) data line bus 76 to a complementary universal serial bus (USB) 78. The computer 12 can access the data on the USB port and determine which key fobs 30 in the security cabinet 14 are secure and which ones are not.

Figure 6:
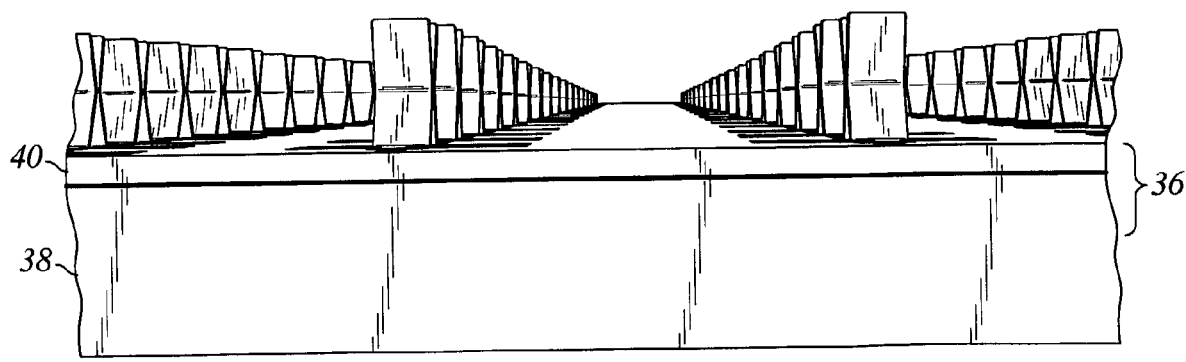
FIG. 6 is a side view of the dress plate in contact with the main board of the present invention.

FIG. 6. is an inverted side view of a reception panel 36 comprised of a dress plate 38 attached to the main board 40. The main board 40 is physically attached to the above dress plate 40 via bolts or other connection means. One side of the thick dress plate 38 connects to the top side of the main board to physically support the key fob 30 and a plurality of keys 54 attached to the key fob 30. In existing designs, an air gap separated the panel and the main board, which led to contamination of the printed circuit board traces or electronic circuitry when debris or dirt fall into a slot of the array. The dress plate 38 and the main board 40 are attached together, and the metal traces and the electronic circuitry are on the opposite side of the board, protected from dirt and debris that enters the slots of the array.

Figure 7:
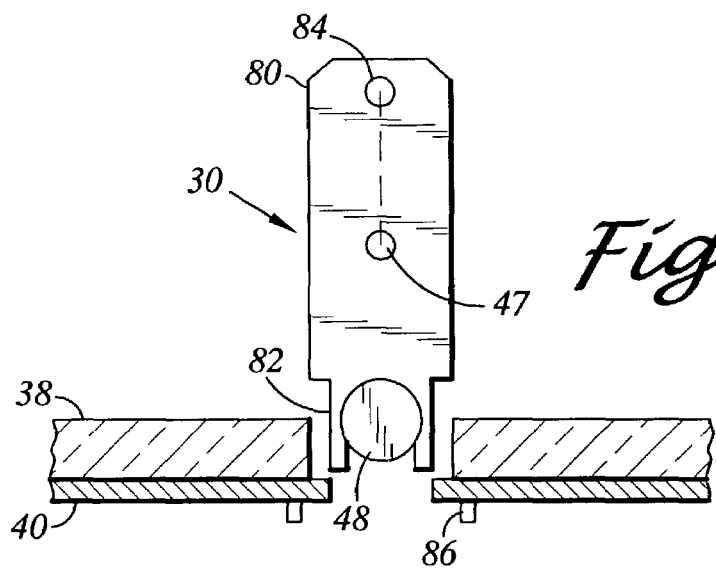
FIG. 7 is a schematic illustration of the key fob support structure of the present invention.
Figure 8A:
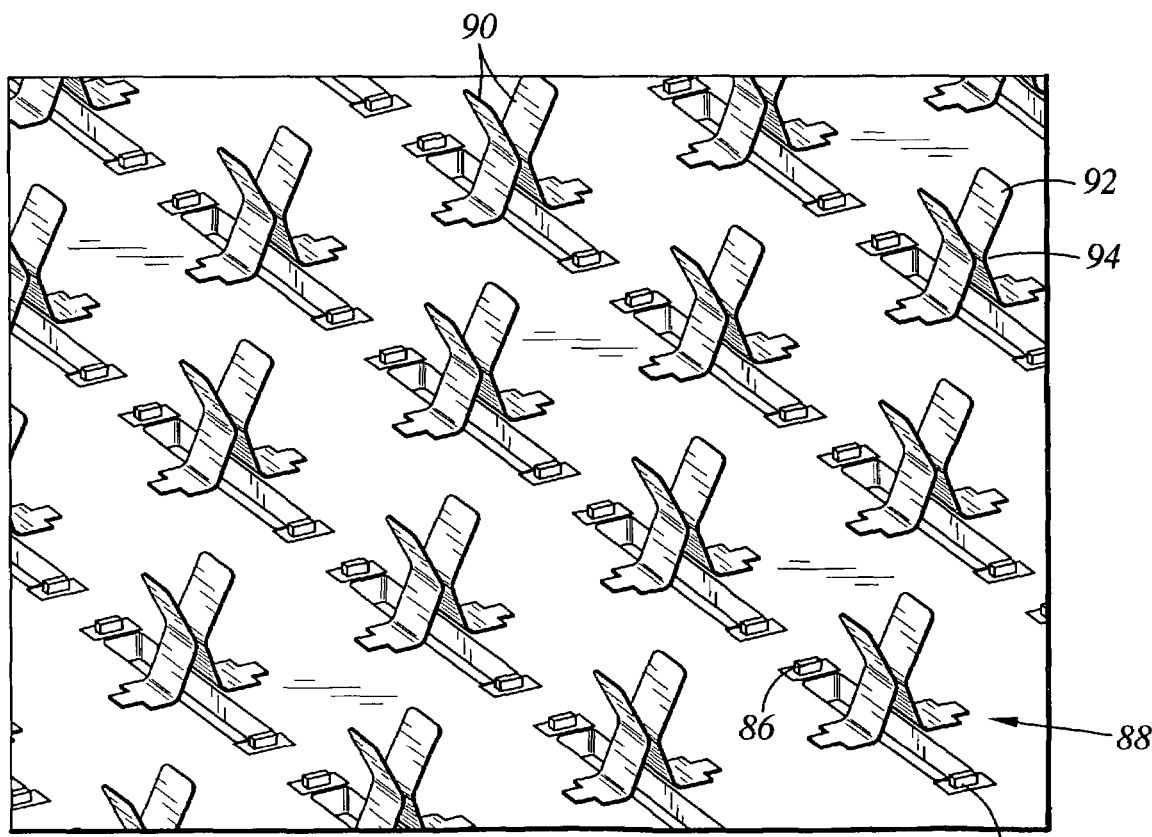
FIG. 8A is a perspective view of an array of metal contacts on the bottom side of a portion of the main board of the present invention.
Figure 8B:
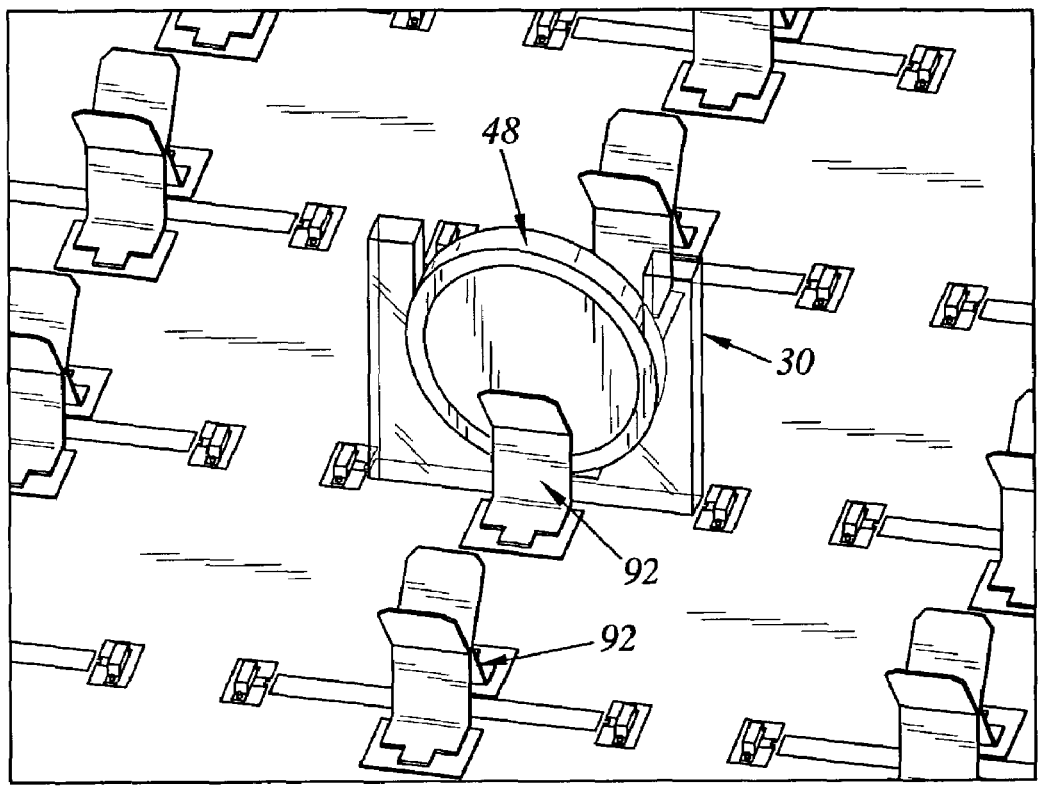
FIG. 8B is a perspective view of the metal contacts of a slot engaging a fob on the bottom side of a portion of the main board of the present invention.
Figure 8C:
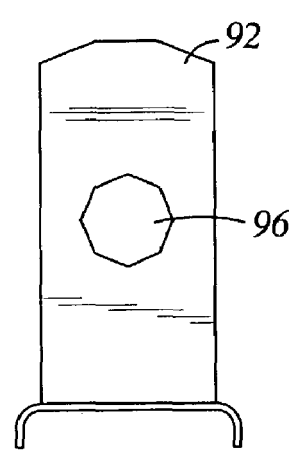
FIG. 8C is a side view of one of the two prongs of the metal contacts of the main board of the present invention.
Figure 8D:
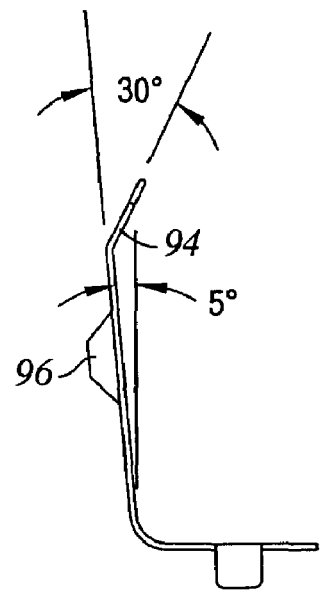
FIG. 8D is a lengthwise view of one of the two prongs of the metal contacts of the main board of the present invention.

FIG. 7 shows the key fob 30 support structure. As, shown the key fob 30 is a symmetrically shaped. In the shown embodiment of the present invention, the key fob 30 has a top section 80 and a bottom section 82. In the top section 80, a hole 84 is drilled for attachment of the vehicle keys or other item to be tracked. Other holes may be included on the fob for the attachment of other items. In the fob shown in FIG. 7, an additional hole 47 is included. On the bottom section 82, the key fob 30 is tongue shaped and contains a memory device 48. As shown in FIGS. 7 and 8B, the bottom section 82 is an open prong for the snap-in receiving of the memory device 48. The snap-in prong configuration allows for the easy insertion and removal of the memory device 48 and eliminates the use of a press ring as shown in the prior art. The memory device 48 is a serial Ibutton that provides vehicle identification information for keys attached to it. The tongue 38 of the key fob 30 is slightly smaller than top section 80 of the key fob 30 so that the key fob 30 may be inserted in a controlled distance into the main board 40. The dress plate 38 is made of high density plastic about ½ to ¾ of an inch thick to support the key fob 30. The top side of the main board 40 is attached to the dress plate 38 using bolts. An LED 86, attached to each slot (not shown), lights to assist the user to locate the desired key fob 30. In the configuration shown in FIGS. 7 and 8A, LEDs 86 are positioned on each side of the slot to provide redundancy and additional illumination. Prior designs required strong metal contacts such that the contacts had to be riveted to the main printed board, resulting in high manufacturing costs for the metal contacts. The present invention is less expensive because the metal contacts (not shown) that interface the fob 30 do not require a special attachment method and may be inexpensively soldered to a printed circuit board.

Figure 12A:
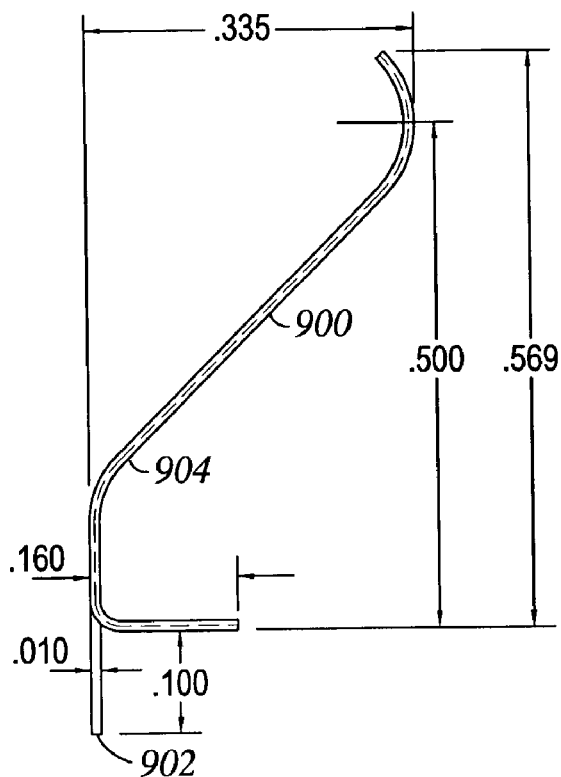
FIGS. 12A and 12B shows an alternate construction of metal contact prongs of the present invention.
Figure 12B:
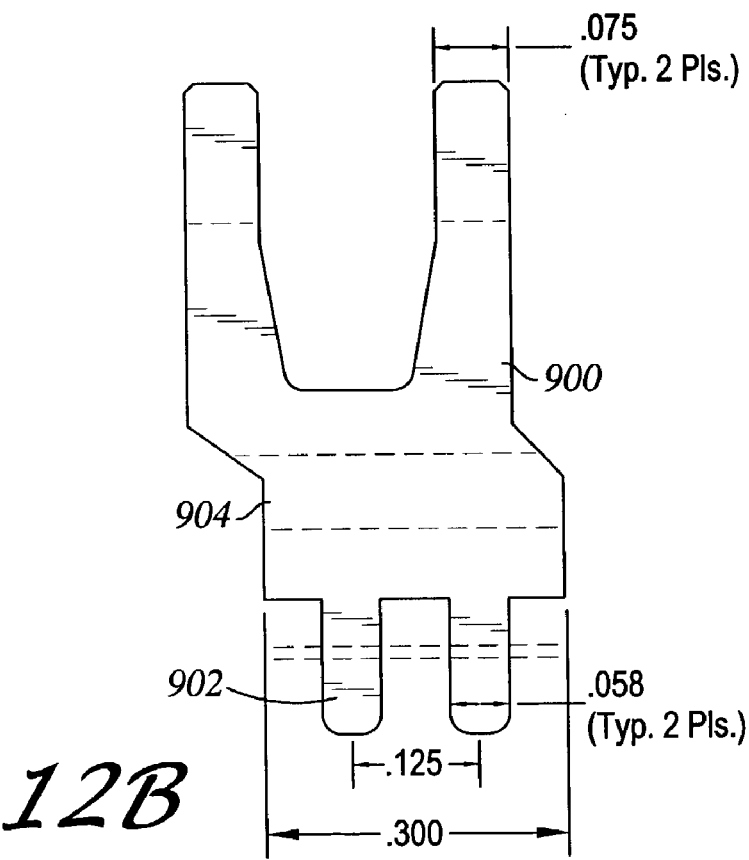

FIGS. 8A-8D and FIG. 5 shows an array of metal contacts 88 on the bottom side of the main board 40. Pairs of metal contacts 90 provide electronic and mechanical connections to the main board 40. The pairs of metal contacts 90 are constructed typically of beryllium copper and tin plated for strength and good electrical conductivity. The pairs of metal contacts 90 provide a biased force for each electrical contact of the memory device 48 inside the key fob 30. In the shown embodiment, each metal contact 92 of the pair is bent at a crease 94 near the center, at an angle about 30 degrees from vertical. In addition, the pairs of metal contacts 90 from the present invention are more reliable than the previous designs because the pairs of metal contacts 90 are not required to support the mass of the key fob 30, including the attached keys 54(not shown) inserted into a main board 40. A raised surface area 96 aids in completing the contact with the memory device 48. As shown in FIGS. 12A and 12B, an alternate configuration of the prongs are shown.

Figure 9A:
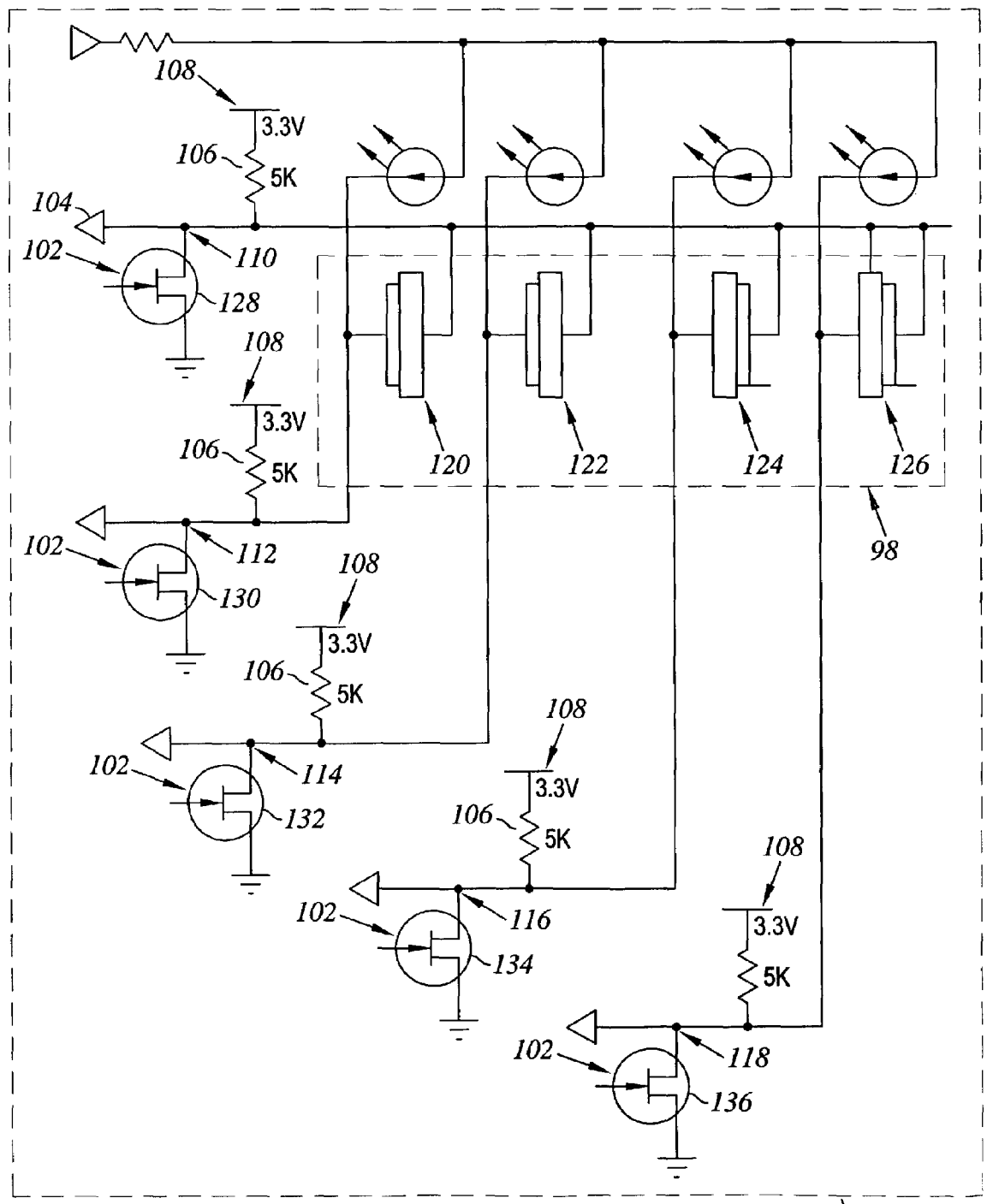
FIGS. 9A-9B represent a circuit diagram showing the major components for electrically activating a plurality of key fobs as described in the present invention.
Figure 9B:
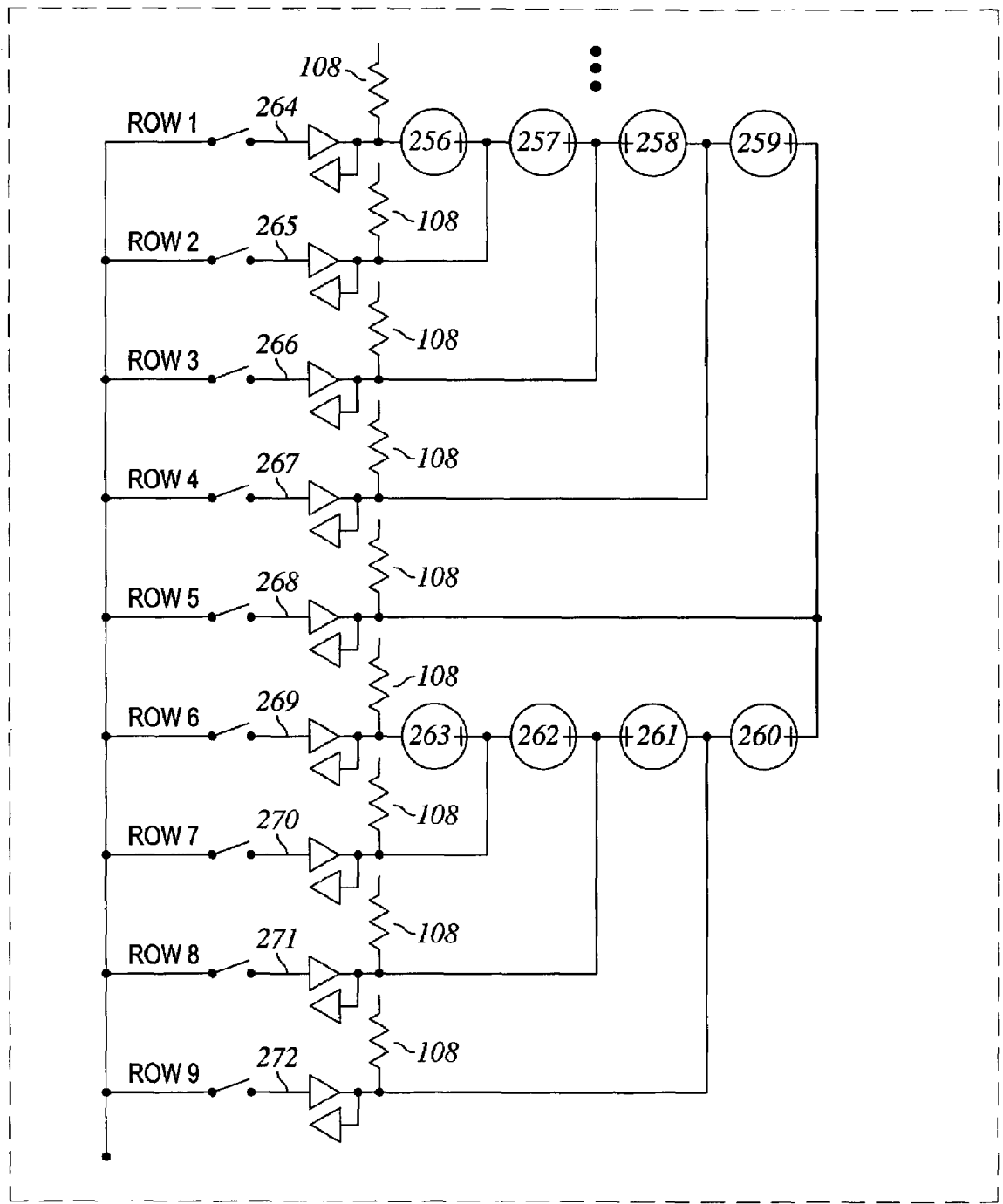

FIGS. 9A-9B show a wiring diagram showing the major components for electrically activating a plurality of key fobs 30 which is independent of the memory device insertion polarity. In prior art systems, the bus communication scheme required the positive contact of the memory device key card to be connected to any row in the array matrix and the ground terminal of the memory device connected to the column of the array matrix. In the shown embodiment of the present invention, the memory devices 98 are inserted into the slot independent of polarity. This polarity independent insertion results from the wiring of the slots of the array and the software routines stored in the FPGAs 68 and 70 (not shown).

In the shown embodiment of the present invention, a hardware representation 100 includes latches 102, buffer amplifiers 104, and pull-up resistors 106 to the power 108 from a USB and an onboard integrated voltage regulator (not shown). In this representation, one electrical contact of each slot of one column are wired to a common electrical contact 110 and the other electrical slot contacts, 112, 114, 116, and 118 are electrically connected to separate contact points. In this representation, a latch 102 either ties the contact point to ground or to a high voltage value. To receive data from the memory devices 120 and 122 inserted with this polarity, the latch circuits 130, 132, 134, and 136 are tied to ground and the common latch circuit 128 is tied to a high voltage value. To receive data from the memory devices 124 and 126 inserted with the opposite polarity, the latch circuits 130, 132, 134, and 136 are tied high and the common latch circuit 128 is tied to ground.

In another embodiment of the present invention as shown in FIG. 9B, multiple rows of memory devices can be simultaneously read. In the first read state of system 138, row 1, row 3, row 5, row 7, and row 9 are attached to power 108 and row 2, row 4, row 6, and row 8 are grounded. In the first read state, memory devices 257, 258, 259, 260, and 263 are read. In the second read state of system 138, row 1, row 3, row 5, row 7, and row 9 are set to ground by latches 264, 266, 268, 270, 272 and row 2, row 4, row 6, and row 8 are attached to power 108. In the second read state, memory devices 261 and 262 are read. This same single wire connection scheme illustrated in system 138 can be extended to N rows and M columns of memory devices. In addition, the system 138 only requires one wire per memory device to read a memory device that can be inserted in either electronic polarity.

However, even if a prior grid system was modified by allowing rows and columns to electronically switch polarity to read electronically opposing memory devices, only one memory device could be read at time. For instance, if the column 1, row 1 memory device 251 needs a ground on column 1 wire, but the column 1, row 2 memory device 252 needs a power connection on the column 1 wire; 251 and 252 memory devices could not be read at the same time. For a security drawer with over 250 memory devices, the time to read each opposing electrical polarity memory devices one at a time would be prohibitive.

The present invention hardware implementation is most cost effectively realized using a field programmable logic gate array (FPGA). In an embodiment of the present invention, a field programmable gate array (FPGA) contains logic functions that a user programs to map each memory slot contact point to access the data contained in each memory device of the array and to process it through the FPGA.

A user will program the input/output (I/O) ports of the FPGA using Boolean Logic expressions to do the following: periodically or on demand alternate the contact voltage of multiple memory slot contacts to detect a memory device, download timing information of any memory device, and transfer this information to one or more controllers so that a user can readily access the data.

Figure 10A:
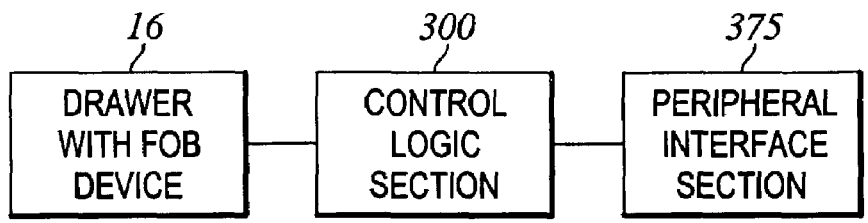
FIG. 10A is a block diagram representation of a system controller of the present invention.

FIG. 10A is a block diagram representation of a system controller. The system controller includes a plurality of major circuitry sections include a control logic section 300, and a peripheral interface section 375.

The control logic section 300 communicates electronic data between at least one memory device located in the array (not shown) and the peripheral interface section 375. In an embodiment of the present invention, a Field Programmable Gate Array (FPGA), i.e. a XILINX Spartan XCS40XL, is acceptable for the control logic section 300. The FPGA contains 40,000 system gates and provides up to a density of 1862 logic cells for user programming. The XCS40XL includes a plurality of Input/Output (I/O) data lines 360, General Purpose Input/Output (GPIO) data line 76, internal combinational logic blocks (not shown), POWER ON line 400, PRGM line 401, a CCLK line 403, an INT line 412, a plurality of VCC lines 405, and a plurality of GND lines 410.

Contained internally within the FPGA are user configurable logic blocks (not shown). The configurable logic blocks generally include: and, nor, or, various memory storage elements, multiplexors, flip-flops, and latches. A user writes one or more Boolean logic expressions using the above logic blocks to receive and to transmit data between a plurality of I/O data lines 360 and GPIO data line 76. A user programs the FPGA using software from the manufacturer. The user programs the FPGA to read data from all inserted memory devices independent of polarity.

Figure 10B:
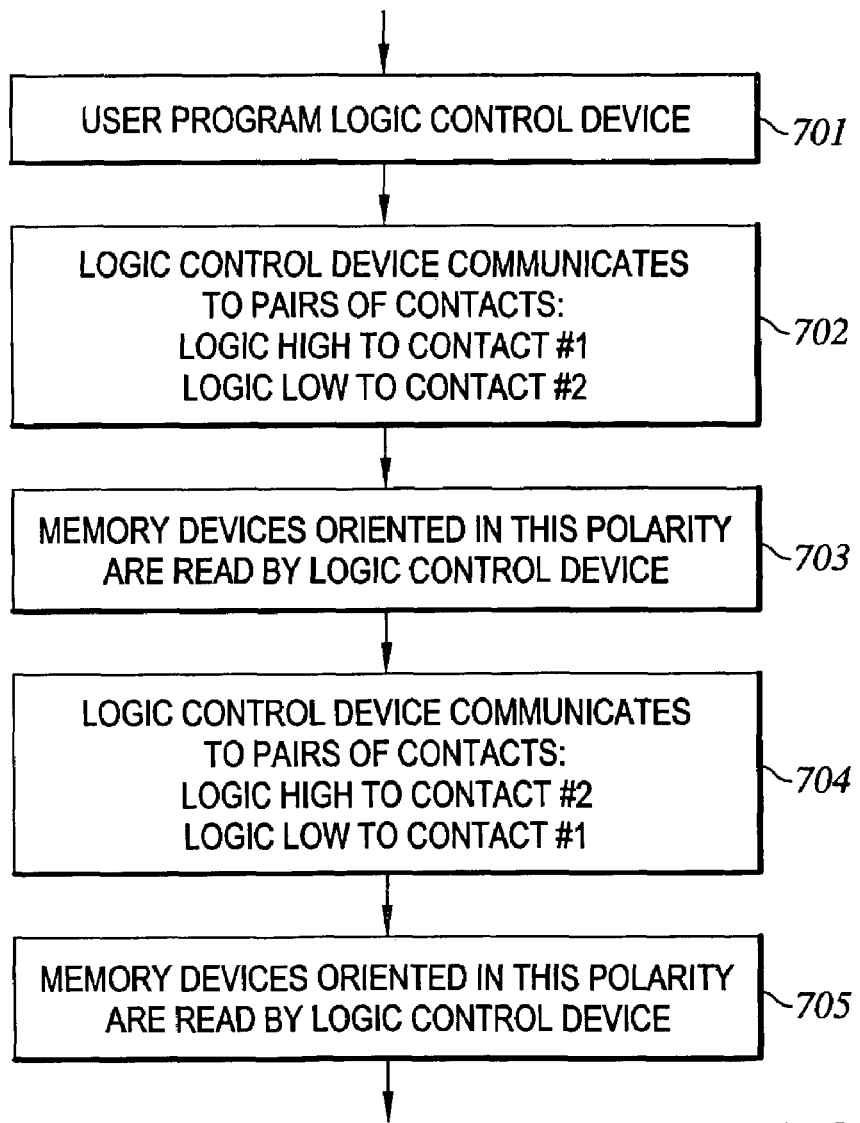
FIG. 10B is a flow chart describing the a method of the present invention for accessing the fob memory devices independent of insertion polarity.

In an embodiment, the method of the present invention described in FIG. 10B provides for accessing electronic memory devices independent of insertion polarity. Initially, a user programs a logic control device to access at least one column of slots (step 701). Specifically, in the embodiment of the method, a user programs a series of logic functions that reads the electrical signals from all memory devices in one column and writes the data to the desired output port of the logic control device, such as an FPGA. In an alternative embodiment of the present invention, the control logic device may access more than one column without data loss because the logic control device initially receives a unique identification code before the memory device transmits the data.

Along the same column of memory devices, the logic control device outputs a logic high value on the first metal contact and ground to the second metal contact of the electronic memory device (step 702). In this step, the logic control device can activate all memory devices inserted in this orientation in the array. Once at least one memory device is activated, the memory device transmits a unique identification code to the logic control device. Afterwards, the timer of the memory device begins counting. Upon removal of the memory device from the array, the timer will stop counting.

Upon reinsertion of the memory device into the array, the timer will resume counting. The memory device internally stores the length of time that the timer is activated.

The memory device reads and writes user data requests through the logic control device (step 703). In this step, the data that is stored in the memory device may be read by the logic control section and routed to an I/O port. Periodically, the computer will request the logic control section to communicate with one or more memory devices, to record the value of the memory device interval timer, and to determine the status of the memory device.

Afterwards, the logic control device reverses the polarity of the I/O ports along the same column so that first metal contact is tied to ground and the second metal contact is tied to a logic high value (step 704). This step allows all memory devices with this polarity to be read by the electrically connected logic control unit. In this step, the I/O port transmits a low logic level to poll the memory device to stop its interval timer. A logic high level is transmitted to activate one or plurality of memory devices or to communicate that one or more memory devices are missing. Once the memory device is activated, the interval timer begins counting. Upon removal of the memory device from the array, the internal timer will stop counting. Upon reinsertion of the memory device into the array, the memory device interval timer begins counting. Following, the memory device sends a unique identification code so that the logic control device may read the data (step 705).

Figure 10C:
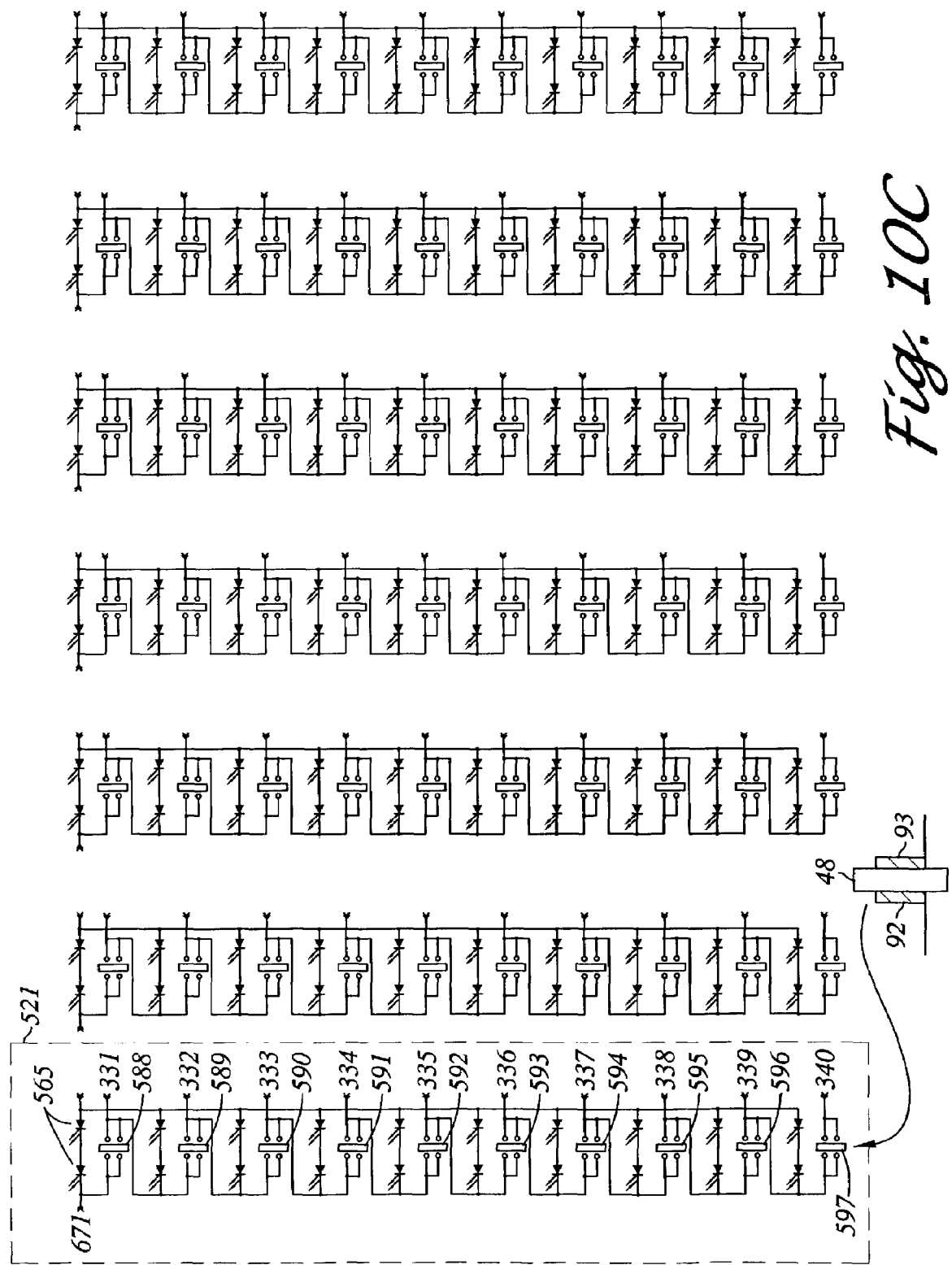
FIGS. 10C-10E are circuit diagrams showing the arrangement of the detection of the fob memory devices independent of insertion polarity.
Figure 10D:
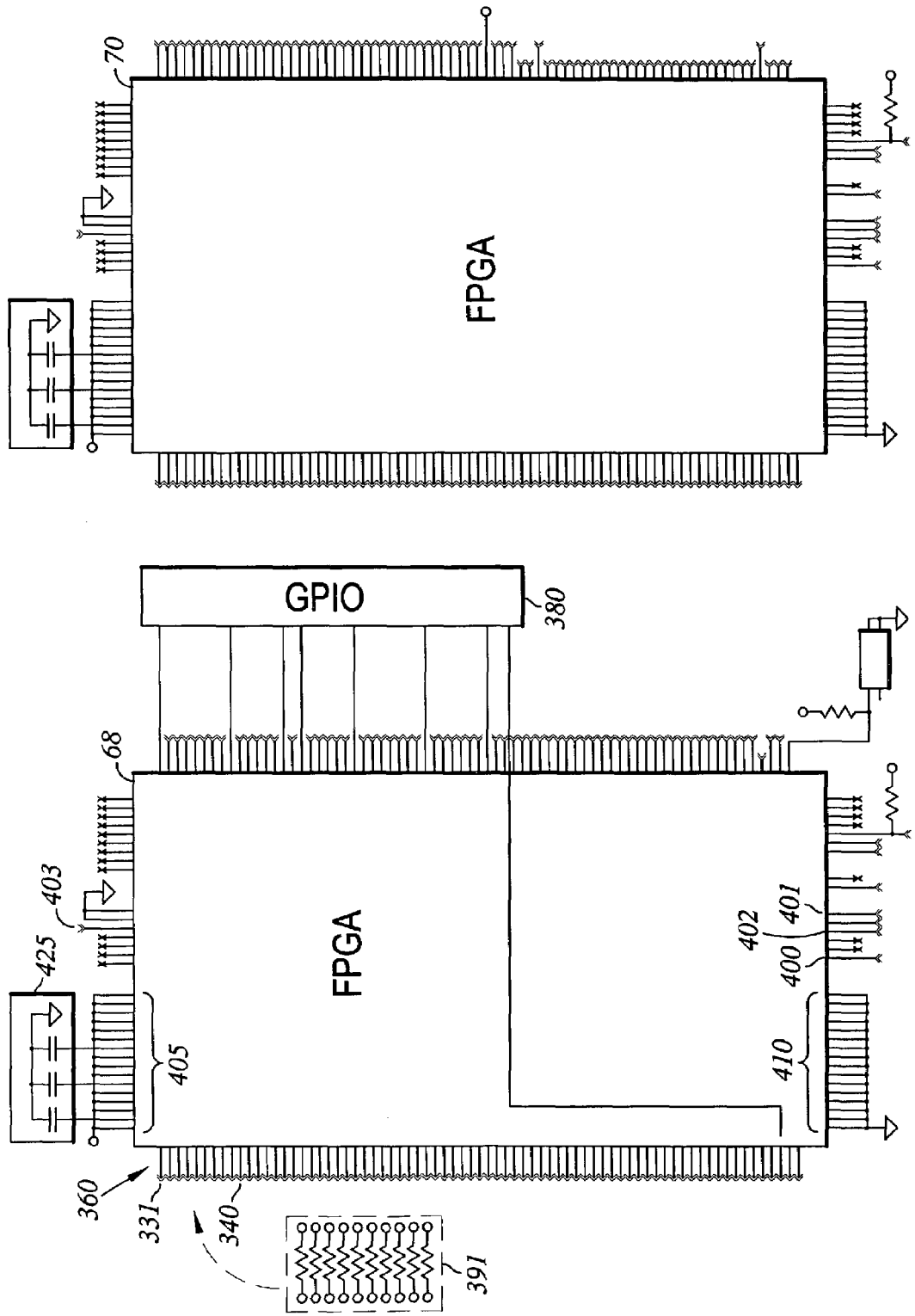
Figure 10E:
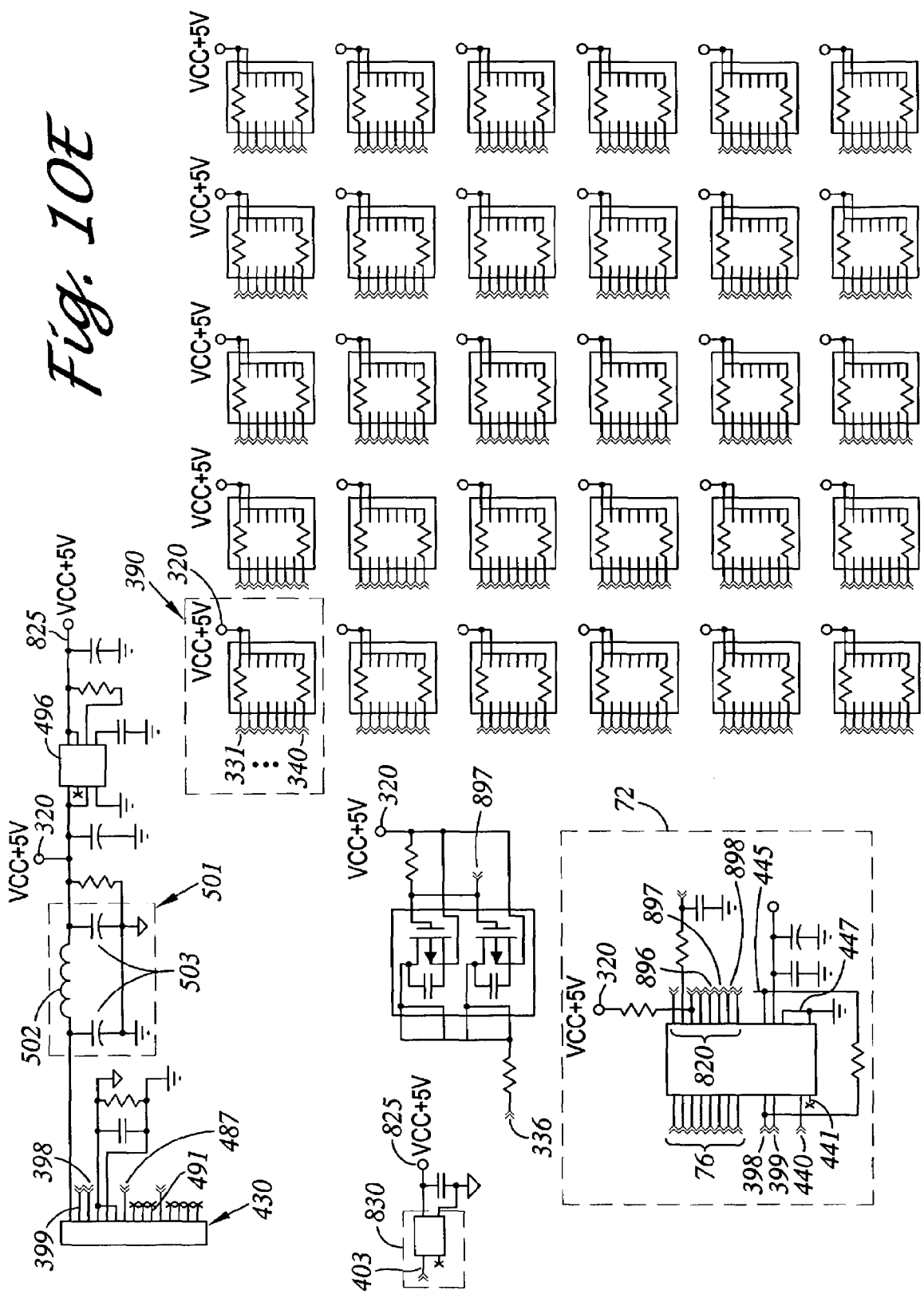

Again referring to FIG. 10C-FIG. 10E, a plurality of I/O data lines 331 inclusive through 340 from FPGA 68 is electrically routed to slots within the array (not shown). The memory slots are electrically wired for FPGA detection of memory devices independent of insertion polarity. A plurality of memory slots, 588 inclusive through 597, is serially wired within the same column 521 on the main board in the drawer (not shown). This wiring arrangement supplies each metal contact of the array independent I/O port access to the FPGA 68 allowing the logic control section 300 to communicate data to the attached peripheral interface section 375 to read memory device 48 status independent of polarity.

Each pair of metal contacts 370, one metal contact 670 is attached to each side of the slot. All slots 588 through 597 have one electrical connection to an I/O port on the FPGA 68. Each slot 588 through 597 has at least one pull up resistor 370 to the dc power supply 320. The first metal contact 163 on each slot is biased high and the other contact 164 is biased to ground. With this bias arrangement, all memory devices oriented in this direction transmit an identification code and data to the FPGA 68. On the next clock cycle, the FPGA 68 reverses the voltage polarity to each metal contact so that the memory devices 48 with this polarity are read. A slot contact 671, on the top diodes of each column, enable the upper slot of the column to access an I/O port of the FPGA 68.

In an alternative embodiment of the present invention, to protect against transient voltage surges, a series-damping resistor 391 can be placed between each metal contact on a slot and each I/O port 331 through 340 of the FPGA 68. In another embodiment of the present invention, Light Emitting Diodes LEDS 565 are electrically connected from a LED_PWR line 336 to one metal contact of each memory slot. The DC supply voltage 320 passes through a voltage level-shifting network 379 to obtain the required LED_PWR line 365 voltage to power the LEDS 365. The LEDS 365 illuminate when a memory device slot is polled by the computer 12. The LEDS 365 are used to locate a key fob or an empty slot to replace the key fob (not shown).

In an alternative embodiment of the present invention, additional FPGAs, such as 70, are daisy chained to track additional key fobs. In an alternative preferred embodiment of the present invention, more than one column can be polled under the same principles. For example, N column array of slots may be polled in parallel using the same alternate voltage application arrangement, achieving faster retrieval of key fob status.

In another embodiment of the present invention, the same principle allowing orientation independent accessing of memory devices as shown above in one column could work for memory devices wired in rows instead of columns. In this embodiment, all the rows are serially wired together and alternate metal contacts of each pairs of contact are connected with high or low values, so that the FPGA can read these memory devices also. In summary, this orientation independent read and write from memory devices allows a user the freedom to insert the key fob in either direction and still obtain accurate status on the key fobs either in the array or missing from the array.

To activate the FPGA 68, the POWER ON line 400 is pulled to a high value. The PRGM line 401 is high if the FPGA 68 is actively receiving a program instruction set from a peripheral interface section 375 along the GPIO data line 76. An external clock CCLK line 403 is input to the FPGA 68 to more accurately transmit the entire dataset from each memory device to the peripheral interface section 375. Power to the FPGA 68 is supplied through a plurality of VCC lines 408 that are decoupled with shunt capacitors 425 from transient signals. A return signal path to the FPGA is provided by a plurality of GND lines 410. An INIT line 412 is a multipurpose bi-directional input that perform may functions such as clearing the internal memory of the FPGA, reinitiating a new cycle of FPGA instructions, or holding the FPGA in an internal wait state before configuration.

In another embodiment of the present invention, a logic control section 300 could be an Application Specific Integrated Circuit (ASIC) or a PIC device. It is understood that the scope of the present invention includes other electronic devices that have internal logic gates that route channels or paths to interconnect configurable logic blocks, based on user input Boolean functions, between I/O ports connected to bi-directional memory devices and a peripheral controller.

A peripheral interface section 375, according to the preferred embodiment of the present invention, will provide the signal translation from the GPIO data line 76 on the FPGA 68 and the complementary data lines, USB−line 398 and the USB+line 399, on a user's computer through an attached connector 430. The basic function of the peripheral interface section 375 is to read and write data based on software programming from a logic interface section 300 and one or more USB ports on the computer. For the preferred embodiment of the present invention, a Cypress enCore USB CY7C63722 72 combination Low Speed USB Peripheral Controller is acceptable. The CY7C63722 is an 8 bit-bit RISC one Time Programmable microprocessor. The CY7C63722 micro-controller includes 2 GPIO lines 76 and 820, a USB+line 399, USB−line 398, XTALIN line 440, XTALOUT line 441, VREG line 445, VCC line 446, and VPP line 477.

Similar to programming the FPGA 68, the Cypress micro-controller 72 is user programmed to communicate data between one port of GPIO 820 data lines and the attached USB −line 398 and USB+399 line. The Cypress micro-controller provides up to 6 megabytes of machine instruction storage in a Programmable Read Only Memory (PROM). The USB+line 399 and USB−line 398 are differential data lines that communicate memory device data between the computer. XTALIN line 440 provides a high precision, low noise emission clock reference for data transfer operations. A CCLK 403 input of 6 MHz is input into the XTALIN line 440 to provide more stable data transfer. A XTALOUT line 441 is grounded in the preferred embodiment because an external reference clock is utilized. A VREG line 445 is connected through a pull-up 1.3K pull-up resistor to supply power to the USB+line 399. A VCC line 446 provides FPGA device connection to the DC supply 320. The VSS line 447 provides the return path to ground. The VPP line 448 is high when the peripheral port is programmed, but normally connected to ground.

The other GPIO data lines 820 provides I/O ports to other connected circuitry such as: LED_GATE line 897 connecting to at least one diode driver circuit 379; SEL_CTL line 491 that selects which drawer will be assessable by the user; or PWRDWN line 896 activating the FPGA 68.

It is understood that the scope of the present invention could include other data controller or hardware elements that provide similar function to map data signals from one media location to another media location without a loss of data.

A connector 430 provides electronic connections to an attached computer, the peripheral interface section 375, the security cabinet (not shown), an oscillator 830, and a power level converter 496. The connector has the following data lines: USB+line 399, USB−line 398, VCC3.3 V line 485, Drawer_slot line 487, and Sel_CTL line 491. A peripheral interface section 375 connects to the USB+line 399 and USB−line 398 ports to the computer. The LF3967 496 voltage converter transforms the 5V power supply 320 to a 3.3 voltage supply line 825. The LF2769 input low-pass circuitry 501 consisting of a series inductor 502 and one or more shunt capacitors 503 to eliminate transient signals from the DC bias lines. The 3.3 voltage supply line 825 is connected to a 6 MHz crystal oscillator 830 that provides a high frequency stable reference source for the peripheral port section 385 and the logic control section 300. The DRWR_SEL line 487 controls which drawer will accept user requests for key fob status.

Figure 11A:
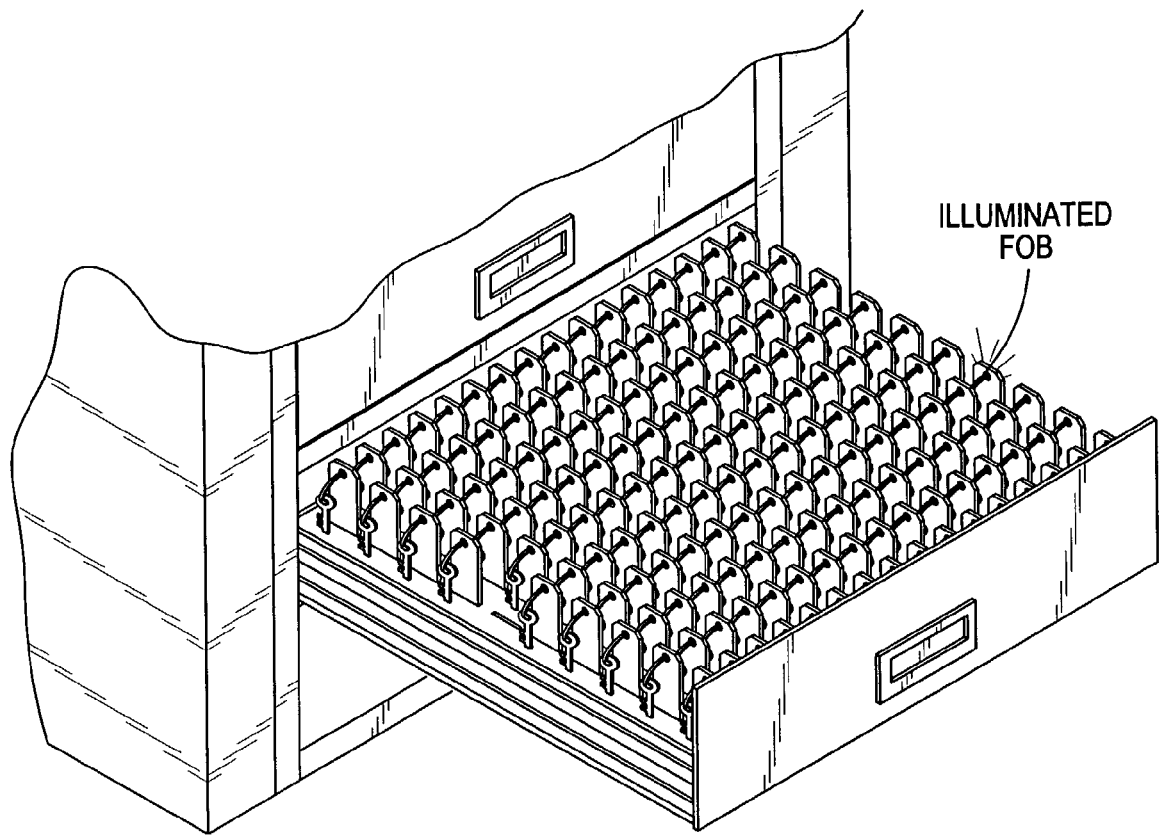
FIGS. 11A and 11B shows the configuration of the illuminated key fob system.
Figure 11B:
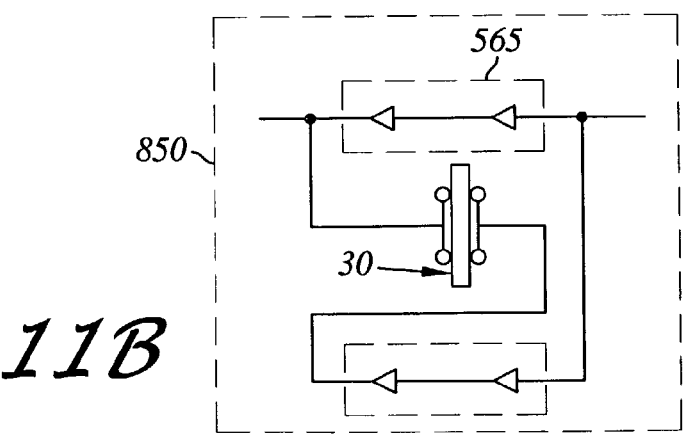

FIG. 11A and FIG. 11B shows an illuminated key fob system which eases a user locating an object from an array of objects. This illumination system eliminates the need for manually finding objects within a crowded array of objects. The following description is the preferred hardware embodiment of the illumination system and should not be taken as the only way to perform the same function. The illumination system is a result of the lighting device-wiring diagram 850, the key fob material, and the memory device material. As part of the wiring diagram, LEDS 565 are electrically connected to each key fob as shown in a prior section, as well as this figure of the disclosure.

In the shown embodiment of the present invention, at least one LED 565, or alternatively an LED (not shown), associated with the key fob 30 is activated when a slot is activated. In other embodiments of the present invention, other light emitting devices may be substituted for LEDs. In the preferred embodiment of the present invention, the memory device is made with a light reflective materials including but not limited to silver, gold, or other shiny metal. The key fob material is a translucent material such as quartz or acrylic.

The LED light transmitted alongside the desired slot will reflect off the memory device, then will scatter throughout the translucent key fob. Due to the surface discontinuity produced by the translucent material and air, the key fob will illuminate the light most brightly along its edges. This system is an improvement over prior art key tracking systems because it eliminates the difficult task to manually locate the key fob slot when the array is partially or almost completely occupied. In addition the memory device 48 may be coated with a highly reflective material to aid in the transmission of light through the fob 30.

This illumination scheme will work with other systems where objects need to be illuminated and should not be limited in any way by its use in the preferred embodiment described above.

Referring particularly to FIGS. 12A and 12B there is shown an alternate prong configuration to the prongs 92 as shown in FIGS. 5C, 5, 8A, 8B, 8C and 8D. More particularly, prong 900 is shown with its offset configuration to provide greater contact with the memory device 48. The biased prong 900 engages the memory device 48 and is formed from beryllium copper tin-plated. Down tabs 902 engage the circuit board and are mass soldered to the board. The ridge 904 and steep angle of the prong 900 provide sufficient space to avoid unwanted material from being trapped between the prongs.

It should be noted and understood that with respect to the embodiments of the present invention, the materials suggested may be modified or substituted to achieve the general overall resultant high efficiency. The substitution of materials or dimensions remains within the spirit and scope of the present invention.

We claim:

1. An object inventory tracking system comprising:
   a) a reception panel, including an array of apertures comprising:
      i) an upper face plate defining top and bottom surfaces and including an array of apertures;
      ii) a circuit board defining top and bottom surfaces, said top surface of said circuit board disposed in laminar juxtaposition the bottom surface of said upper face plate, said circuit board including an array of apertures aligned with respective ones of the apertures of said upper face plate; and
      iii) an array of electrical contacts disposed on the bottom surface of said circuit board, each of said contacts aligned with respective ones of the apertures of the upper face plate and said circuit board;
   b) a plurality of fobs adapted to be engageable with an associated object to be inventoried, each of said fobs incorporating an onboard readable memory for storing information identifying the associated object, each of said fobs extensible through respective ones of said apertures and adapted to couple the memory with the electrical contacts of the corresponding apertures of the upper face plate and said circuit board wherein said fob is capable of engaging the contacts in at least two orientations wherein said memory is a touch memory device having a reflective coating to aid in the transmission of light from the light generating device through said fob; and
   c) a microprocessor in electrical communication with said electrical contacts for reading and displaying the location of the fobs disposed in said apertures and for reading and displaying the absence of a fob in said apertures;
   d) at least one light-generating device positioned adjacent each of said electrical contacts and is in electrical communication with said microprocessor wherein said light-generating device is a light emitting diode.

2. The object inventory tracking system of claim 1 wherein the array of apertures of said upper face plate and said circuit board are arranged in a plurality of rows in spaced, generally parallel relation to each other, the apertures of each row being laterally offset in relation to the apertures of any row adjacent thereto.

3. The object inventory tracking system of claim 1 wherein said microprocessor provides visual indication of the location of a fob or open aperture by illuminating said light generating device at a corresponding location on said reception panel.

4. The object inventory tracking system of claim 1 wherein said fob is formed of a light transmitting material adapted to transmit light from said light generating device.

5. The object inventory tracking system of claim 1 wherein each of said electrical contacts comprise a pair of biased prongs adapted to engage contacts of the memory device.

6. The object inventory tracking system of claim 1 wherein said reception panel is positioned within a secure housing.

7. The object inventory tracking system of claim 1 wherein said reception panel is positioned within a drawer of a secure cabinet.

8. The object inventory tracking system of claim 1 wherein said upper face plate is formed of a non-conductive material.

9. The object inventory tracking system of claim 1 wherein said upper face plate is formed of acrylic.

10. The object inventory tracking system of claim 1 wherein said fobs are formed of a non-conductive material.

11. The object inventory tracking system of claim 1 wherein said fobs are formed of acrylic.

12. The object inventory tracking system of claim 1 wherein said microprocessor displays information to a peripheral device.

13. An object inventory tracking system comprising:
    a) an upper face plate defining top and bottom surfaces and including an array of apertures;
    b) a circuit board positioned in planar relation to said upper face plate, below the bottom surface of said upper face plate;
    c) an array of paired electrical contacts disposed on said circuit board, each of said contacts aligned with respective ones of the apertures of the upper face plate;
    d) a plurality of fobs adapted to be engageable with an associated object to be inventoried, each of said fobs incorporating an onboard readable memory for storing information identifying the associated object, each of said fobs extensible through respective ones of said apertures of said upper face plate in at least two orientations and adapted to couple the memory with a pair of electrical contacts of said circuit board; and
    e) a microprocessor in electrical communication with said electrical contacts for reading and displaying the location of the fobs disposed in said apertures and for reading and displaying the absence of a fob in said apertures.

14. The object inventory tracking system of claim 13 wherein the array of apertures of said upper face plate and said circuit board are arranged in a plurality of rows in spaced, generally parallel relation to each other, the apertures of each row being laterally offset in relation to the apertures of any row adjacent thereto.

15. The object inventory tracking system of claim 13 further comprising at least one light-generating device positioned adjacent each of said electrical contacts and is in electrical communication with said microprocessor.

16. The object inventory tracking system of claim 15 wherein said microprocessor provides visual indication of the location of a fob or open aperture by illuminating said light generating device at a corresponding location on said reception panel.

17. The object inventory tracking system of claim 15 wherein said light-generating device is a light emitting diode.

18. The object inventory tracking system of claim 15 wherein said fob is formed of a light transmitting material adapted to transmit light from said light generating device.

19. The object inventory tracking system of claim 13 wherein said memory is a touch memory device.

20. The object inventory tracking system of claim 18 wherein said memory is a touch memory device having a reflective coating to aid in the transmission of light from the light generating device through said fob.

21. The object inventory tracking system of claim 13 wherein said upper face plate, circuit board and electrical contacts are positioned within a secure housing.

22. The object inventory tracking system of claim 13 wherein said upper face plate, circuit board and electrical contacts are positioned within a drawer of a secure cabinet.

23. The object inventory tracking system of claim 13 wherein said upper face plate is formed of a non-conductive material.

24. The object inventory tracking system of claim 13 wherein said upper face plate is formed of acrylic.

25. The object inventory tracking system of claim 13 wherein said fobs are formed of a non-conductive material.

26. The object inventory tracking system of claim 13 wherein said fobs are formed of acrylic.

27. The object inventory tracking system of claim 13 wherein said microprocessor displays information to a peripheral device.

28. An object inventory tracking system comprising:
   a) an upper face plate defining top and bottom surfaces and including an array of apertures
   b) a circuit board positioned in planar relation to said upper face plate, below the bottom surface of said upper face plate;
   c) an array of electrical contacts disposed on said circuit board, each of said contacts aligned with respective ones of the apertures of the upper face plate;
   d) at least one light generating device positioned adjacent each of said electrical contacts;
   e) a plurality of fobs formed of a light transmitting material adapted to be engageable with an associated object to he inventoried, each of said fobs incorporating an onboard readable memory for storing information identifying the associated object, each of said fobs extensible through respective ones of said apertures of said upper face plate and adapted to couple the memory with the electrical contacts of said circuit board and adapted to transmit light of the associated light generating device wherein said fob is capable of engaging the contacts in at least two orientations; and
   f) a microprocessor in electrical communication with said electrical contacts and said light emitting devices for reading and displaying the location of the fobs disposed in said apertures and for reading and displaying the absence of a fob in said apertures.

29. The object inventory tracking system of claim 28 wherein the array of apertures of said upper face plate and said circuit board are arranged in a plurality of rows in spaced, generally parallel relation to each other, the apertures of each row being laterally offset in relation to the apertures of any row adjacent thereto.

30. The object inventory tracking system of claim 28 wherein said memory is a touch memory device.

31. The object inventory tracking system of claim 30 wherein said memory is a touch memory device having a reflective coating to aid in the transmission of light from the light generating device through said fob.

32. The object inventory tracking system of claim 28 wherein each of said electrical contacts comprise a pair of biased prongs adapted to engage contacts of the memory device.

33. The object inventory tracking system of claim 28 wherein said upper face plate, circuit board and electrical contacts are positioned within a secure housing.

34. The object inventory tracking system of claim 28 wherein said upper face plate, circuit board and electrical contacts are positioned within a drawer of a secure cabinet.

35. The object inventory tracking system of claim 28 wherein said upper face plate is formed of a non-conductive material.

36. The object inventory tracking system of claim 28 wherein said upper face plate is formed of acrylic.

37. The object inventory tracking system of claim 28 wherein said fobs are formed of a non-conductive material.

38. The object inventory tracking system of claim 28 wherein said fobs are formed of acrylic.

39. The object inventory tracking system of claim 28 wherein said microprocessor displays information to a peripheral device.

40. An object inventory tracking system comprising:
   an upper face plate defining top and bottom surfaces and including an array of apertures arranged in a plurality of rows in spaced, generally parallel relation to each other, the apertures of each row being laterally offset in relation to the apertures of any row adjacent thereto;
   a circuit board positioned in planar relation to said upper face plate, below the bottom surface of said upper face plate;
   an array of electrical contacts disposed on said circuit board, each of said contacts aligned with respective ones of the apertures of the upper face plate;
   a plurality of fobs adapted to be engageable with an associated object to be inventoried, each of said fobs incorporating an onboard readable memory for storing information identifying the associated object, each of said fobs extensible through respective ones of said apertures of said upper face plate and adapted to couple the memory with the electrical contacts of said circuit board wherein said fob is capable of engaging the contacts in at least two orientations; and
   a microprocessor in electrical communication with said electrical contacts for reading and displaying the location of the fobs disposed in said apertures and for reading and displaying the absence of a fob in said apertures.

41. The object inventory tracking system of claim 40 further comprising at least one light-generating device positioned adjacent each of said electrical contacts and is in electrical communication with said microprocessor.

42. The object inventory tracking system of claim 41 wherein said microprocessor provides visual indication of the location of a fob or open aperture by illuminating said light generating device at a corresponding location on said reception panel.

43. The object inventory tracking system of claim 41 wherein said light-generating device is a light emitting diode.

44. The object inventory tracking system of claim 41 wherein said fob is formed of a light transmitting material adapted to transmit light from said light generating device.

45. The object inventory tracking system of claim 40 wherein said memory is a touch memory device.

46. The object inventory tracking system of claim 44 wherein said memory is a touch memory device having a reflective coating to aid in the transmission of light from the light generating device through said fob.

47. The object inventory tracking system of claim 40 wherein each of said electrical contacts comprise a pair of biased prongs adapted to engage contacts of the memory device.

48. The object inventory tracking system of claim 40 wherein said face plate, circuit board and electrical contacts are positioned within a secure housing.

49. The object inventory tracking system of claim 40 wherein said face plate, circuit board and electrical contacts are positioned within a drawer of a secure cabinet.

50. The object inventory tracking system of claim 40 wherein said upper face plate is formed of a non-conductive material.

51. The object inventory tracking system of claim 40 wherein said upper face plate is formed of acrylic.

52. The object inventory tracking system of claim 40 wherein said fobs are formed of a non-conductive material.

53. The object inventory tracking system of claim 40 wherein said fobs are formed of acrylic.

54. The object inventory tracking system of claim 40 wherein said microprocessor displays information to a peripheral device.

* * * * *

UNITED STATES PATENT AND TRADEMARK OFFICE
CERTIFICATE OF CORRECTION

| | |
|---|---|
| PATENT NO. | : 7,623,032 B2 |
| APPLICATION NO. | : 10/310396 |
| DATED | : November 24, 2009 |
| INVENTOR(S) | : Niederland et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2119 days.

Signed and Sealed this

Twenty-sixth Day of October, 2010

David J. Kappos
*Director of the United States Patent and Trademark Office*